US011968391B2

(12) United States Patent
Choi et al.

(10) Patent No.: US 11,968,391 B2
(45) Date of Patent: Apr. 23, 2024

(54) SYSTEMS AND METHODS FOR PERFORMING MOTION VECTOR PREDICTION USING A DERIVED SET OF MOTION VECTORS

(71) Applicant: SHARP KABUSHIKI KAISHA, Sakai (JP)

(72) Inventors: Byeongdoo Choi, Vancouver, WA (US); Frank Bossen, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 51 days.

(21) Appl. No.: 17/900,142

(22) Filed: Aug. 31, 2022

(65) Prior Publication Data

US 2023/0007297 A1    Jan. 5, 2023

Related U.S. Application Data

(63) Continuation of application No. 17/052,497, filed as application No. PCT/JP2019/018294 on May 7, 2019, now Pat. No. 11,470,346.

(Continued)

(51) Int. Cl.
*H04N 19/577* (2014.01)
*H04N 19/105* (2014.01)
(Continued)

(52) U.S. Cl.
CPC ......... *H04N 19/577* (2014.11); *H04N 19/105* (2014.11); *H04N 19/172* (2014.11);
(Continued)

(58) Field of Classification Search
CPC .. H04N 19/577; H04N 19/105; H04N 19/172; H04N 19/176; H04N 19/187; H04N 19/52; H04N 19/70
See application file for complete search history.

(56) References Cited

U.S. PATENT DOCUMENTS

2010/0310184 A1   12/2010  Yu et al.
2012/0243609 A1    9/2012  Zheng et al.
(Continued)

OTHER PUBLICATIONS

Toshiyasu Sugio et al., "Parsing Robustness for Merge/AMVP", JCTVC-F470, WG11 No. m20900, Joint Collaborative Team on Video Coding (JCT-VC) of ITU-T SG16 WP3 and ISO/IEC JTC1/SC29/WG11, 6th Meeting: Torino, IT, Jul. 14-22, 2011.

(Continued)

*Primary Examiner* — Anner N Holder
(74) *Attorney, Agent, or Firm* — ScienBiziP, P.C.

(57) ABSTRACT

This disclosure relates to video coding and more particularly to techniques for performing motion vector prediction. According to an aspect of an invention, a motion vector and a corresponding reference picture identifier for the motion vector are received; a reference picture corresponding to a second motion vector is determined based on the reference picture corresponding to the received motion vector and a current picture; a scaling value is determined based on the determined reference picture, the reference picture corresponding to the received motion vector, and the current picture; and the second motion vector is generated from the received motion vector by scaling with the scaling value.

4 Claims, 17 Drawing Sheets

Related U.S. Application Data

(60) Provisional application No. 62/738,888, filed on Sep. 28, 2018, provisional application No. 62/693,406, filed on Jul. 2, 2018, provisional application No. 62/685,207, filed on Jun. 14, 2018, provisional application No. 62/669,332, filed on May 9, 2018.

(51) Int. Cl.
*H04N 19/172* (2014.01)
*H04N 19/176* (2014.01)
*H04N 19/187* (2014.01)
*H04N 19/52* (2014.01)
*H04N 19/70* (2014.01)

(52) U.S. Cl.
CPC ......... *H04N 19/176* (2014.11); *H04N 19/187* (2014.11); *H04N 19/52* (2014.11); *H04N 19/70* (2014.11)

(56) References Cited

U.S. PATENT DOCUMENTS

| | | |
|---|---|---|
| 2013/0004092 A1 | 1/2013 | Sasai et al. |
| 2013/0070855 A1* | 3/2013 | Zheng .................... H04N 19/52 375/E7.125 |
| 2013/0287106 A1 | 10/2013 | Lee et al. |
| 2014/0169475 A1* | 6/2014 | Zhang ................. H04N 19/593 375/240.16 |
| 2014/0205014 A1 | 7/2014 | Nakamura et al. |
| 2014/0301444 A1 | 10/2014 | Sasai et al. |
| 2014/0376638 A1 | 12/2014 | Nakamura et al. |
| 2015/0312588 A1 | 10/2015 | Yamamoto et al. |
| 2016/0044335 A1 | 2/2016 | Lee |
| 2016/0119641 A1 | 4/2016 | Park et al. |
| 2016/0241835 A1 | 8/2016 | Ikai et al. |
| 2016/0286233 A1 | 9/2016 | Fukushima et al. |
| 2016/0295226 A1 | 10/2016 | Lim et al. |
| 2016/0309180 A1 | 10/2016 | Nakamura et al. |
| 2017/0238005 A1 | 8/2017 | Chien et al. |
| 2017/0238006 A1 | 8/2017 | Nakamura et al. |
| 2017/0289566 A1 | 10/2017 | He et al. |
| 2017/0310988 A1 | 10/2017 | Lin et al. |
| 2018/0041769 A1 | 2/2018 | Chuang et al. |
| 2019/0058896 A1 | 2/2019 | Huang et al. |
| 2019/0297343 A1 | 9/2019 | Seo et al. |

OTHER PUBLICATIONS

Jianle Chen et al., "Algorithm Description of Joint Exploration Test Model 7 (JEM 7)", JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.

International Telecommunication Union, High efficiency video coding, Series H: Audiovisual and Multimedia Systems, Infrastructure of audiovisual service—Coding of moving video, Telecommunication Standardization Sector of ITU, Recommendation ITU-T H.265, Dec. 2016.

International Telecommunication Union, Advanced video coding for generic audiovisual services, Series H: Audiovisual and Multimedia Systems, Infrastructure of audiovisual services—Coding of moving video, Telecommunication Standardization Sector of ITU, Recommendation ITU-T H.264, Apr. 2017.

Byeongdoo Choi et al., "CE4-related: Bilateral Motion Vector Prediction", JVET-K0302-v3, Joint Video Exploration Team (JVET) of ITU-T SG 16 WP 3 and ISO/IEC JTC 1/SC 29/WG 11, 11th Meeting: Ljubljana, SI, Jul. 10-18, 2018.

Non-Final Rejection dated Jun. 10, 2021 for U.S. Appl. No. 17/052,497 which is the parent application of the Instant application.

Final Rejection dated Dec. 15, 2021 for U.S. Appl. No. 17/052,497 which is the parent application of the Instant application.

Notice of Allowance dated Jun. 2, 2022 for U.S. Appl. No. 17/052,497 which is the parent application of the Instant application.

* cited by examiner

SYSTEMS AND METHODS FOR PERFORMING MOTION VECTOR PREDICTION USING A DERIVED SET OF MOTION VECTORS

CROSS REFERENCE

This application is a continuation of U.S. patent application Ser. No. 17/052,497, filed Nov. 2, 2020, which claims priority under 35 U.S.C. § 119 on provisional Application No. 62/669,332 on May 9, 2018, No. 62/685,207 on Jun. 14, 2018 No. 62/693,406 on Jul. 2, 2018, No. 62/738,888 on Sep. 28, 2018, the entire contents of which are hereby incorporated by reference.

TECHNICAL FIELD

This disclosure relates to video coding and more particularly to techniques for performing motion vector prediction.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.2.65. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) have commenced standardization of video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the $10^{th}$ Meeting of ISO/IEC JTC1/SC29/WG11 16-20 April 2018, San Diego, CA.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In one example, a method of performing motion vector prediction for coding video data, the method comprises receiving a motion vector and a corresponding reference picture identifier for the motion vector, determining a reference picture corresponding to a second motion vector based on the reference picture corresponding to the received motion vector and a current picture, determining a scaling value based on the determined reference picture, the reference picture corresponding to the received motion vector, and the current picture, and generating the second motion vector by scaling the received motion vector according to the determined scaling value.

DESCRIPTION OF EMBODIMENTS

Figure 1:
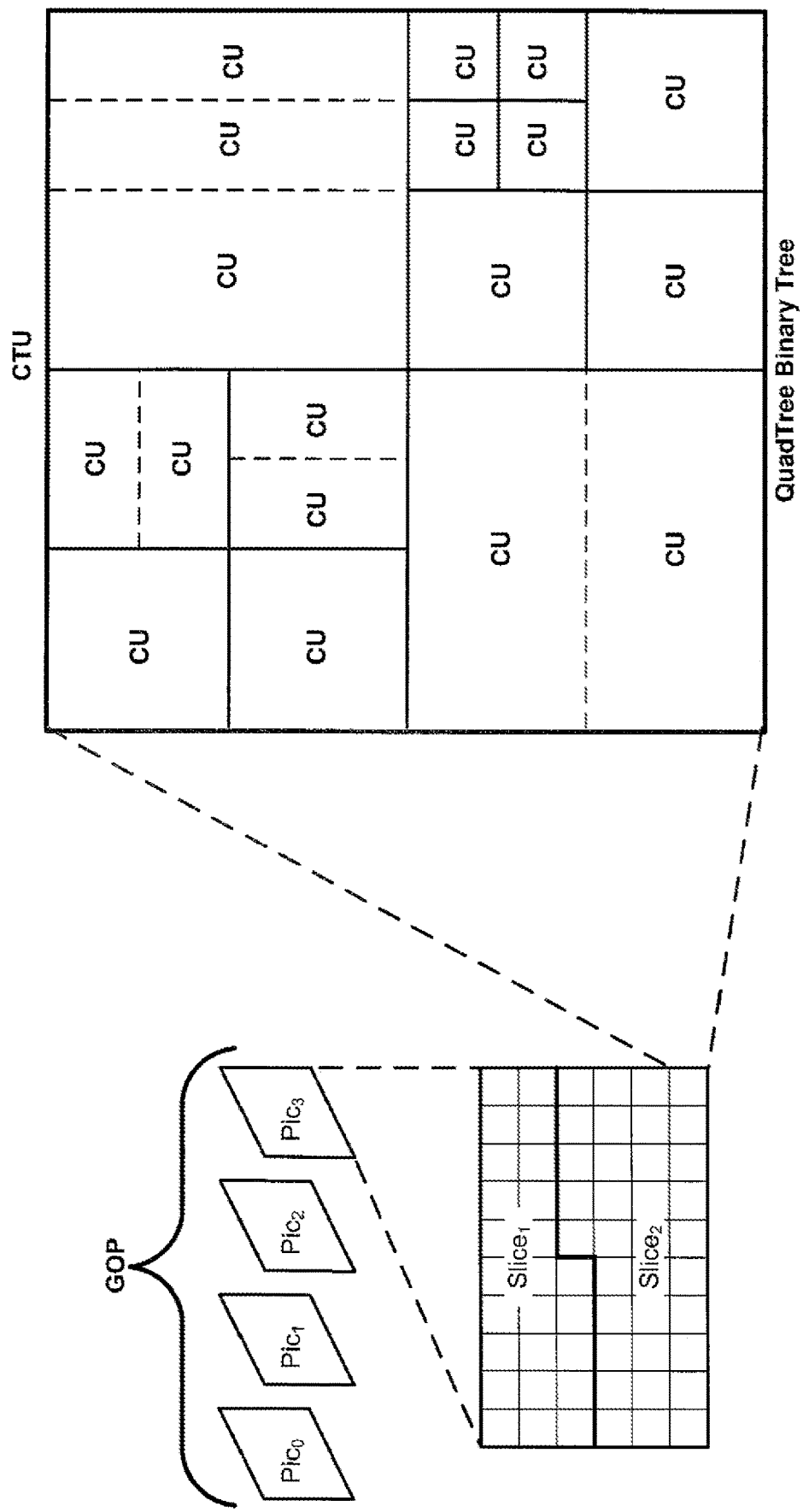
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for motion vector prediction. It should be noted that although techniques of this disclosure are described with respect to, e.g., ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for reconstructing video data comprises one or more processors configured to receive a motion vector and a corresponding reference picture identifier for the motion vector, determine a reference picture corresponding to a second motion vector based on the reference picture corresponding to the received motion vector and a current picture, determine a scaling value based on the determined reference picture, the reference picture corresponding to the received motion vector, and the current picture, and generate the second motion vector by scaling the received motion vector according to the determined scaling value.

In one example, a non-transitory computer-readable storage medium comprises instructions stored thereon that, when executed, cause one or more processors of a device to receive a motion vector and a corresponding reference picture identifier for the motion vector, determine a reference picture corresponding to a second motion vector based on the reference picture corresponding to the received motion vector and a current picture, determine a scaling value based on the determined reference picture, the reference picture corresponding to the received motion vector, and the current picture, and generate the second motion vector by scaling the received motion vector according to the determined scaling value.

In one example, an apparatus comprises means for receiving a motion vector and a corresponding reference picture identifier for the motion vector, means for determining a reference picture corresponding to a second motion vector based on the reference picture corresponding to the received motion vector and a current picture, means for determining a scaling value based on the determined reference picture, the reference picture corresponding to the received motion vector, and the current picture, and means for generating the second motion vector by scaling the received motion vector according to the determined scaling value.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixels values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a video block formatted according to the 4:2:0 format, the width and height of an array of samples for the luma component are twice that of each array of samples for the chroma components. For a video block formatted according to the 4:2:2 format, the width of an array of samples for the luma component is twice that of the width of an array of samples for each chroma component, but the height of the array of samples for the luma component is equal to the height of an array of samples for each chroma component. Further, for a video block formatted according to the 4:4:4 format, an array of samples for the luma component has the same width and height as an array of samples for each chroma component.

Video blocks may be ordered within a picture according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (also referred to as an largest coding unit (LCU)). In ITU-T H265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice.

In JEM, a QTBT is signaled by signaling QT split flag and ST split mode syntax elements. Further, in JEM, luma and chroma components may have separate QTBT partitions. That is, in JEM luma and chroma components may be partitioned independently by signaling respective QTBTs. Currently, in JEM independent QTBT structures are enabled for slices using intra prediction techniques. In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 2:
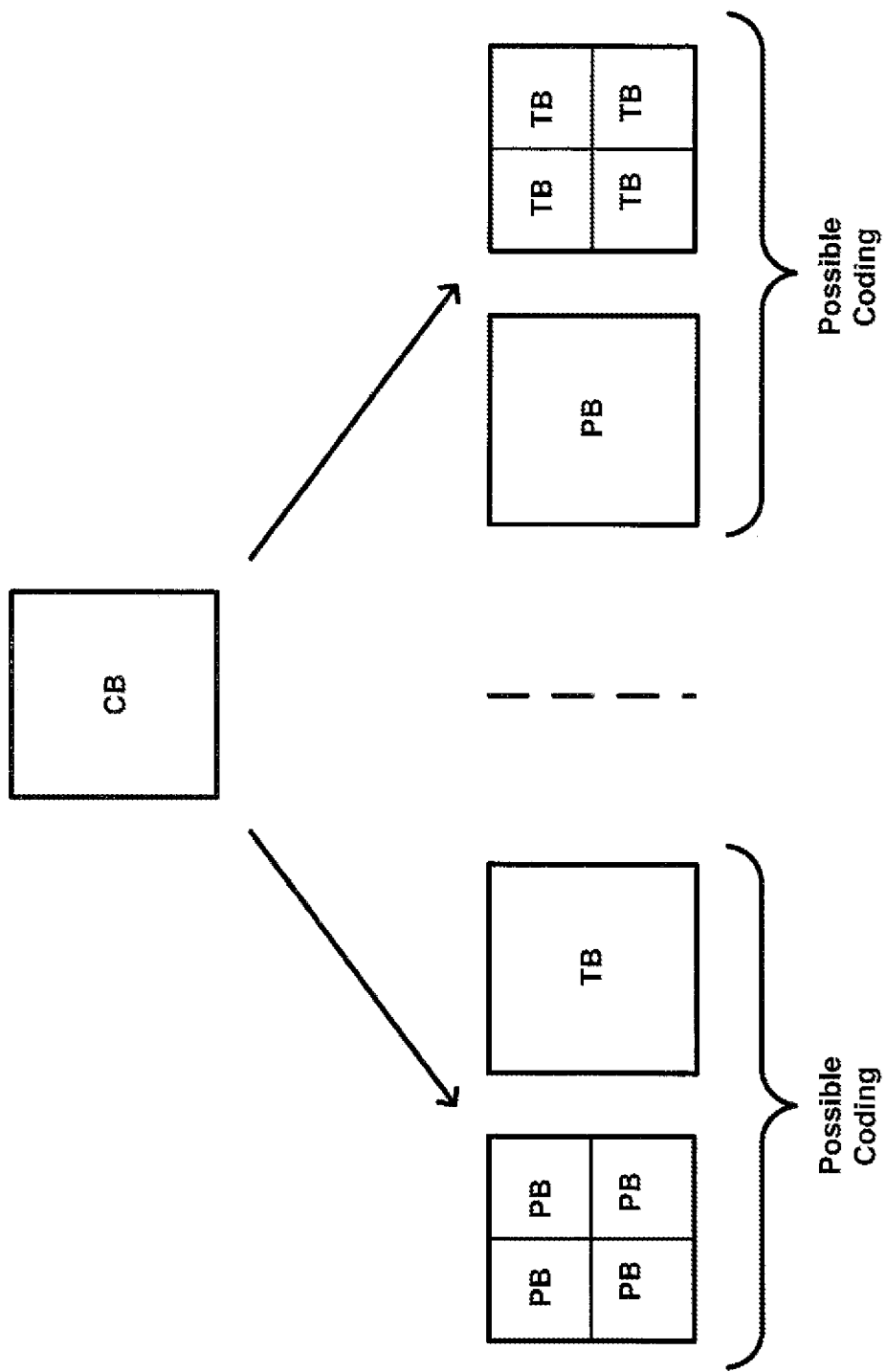
FIG. 2 is a conceptual diagram illustrating possible coding structures for a block of video data in accordance with one or more techniques of this disclosure.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a, 16×16 array of residual values). For each component of video data, such sub-divisions of difference values may be referred to as Transform Blocks (TBs). It should be noted that in ITU-T H.265, TBs are not necessarily aligned with PBs. FIG. 2 illustrates examples of alternative PB and TB combinations that may be used for coding a particular CB. Further, it should be noted that in ITU-T H.265, TBs may have the following sizes 4×4, 8×8, 16×16, and 32×32. In JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization essentially scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values.

Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 3A:
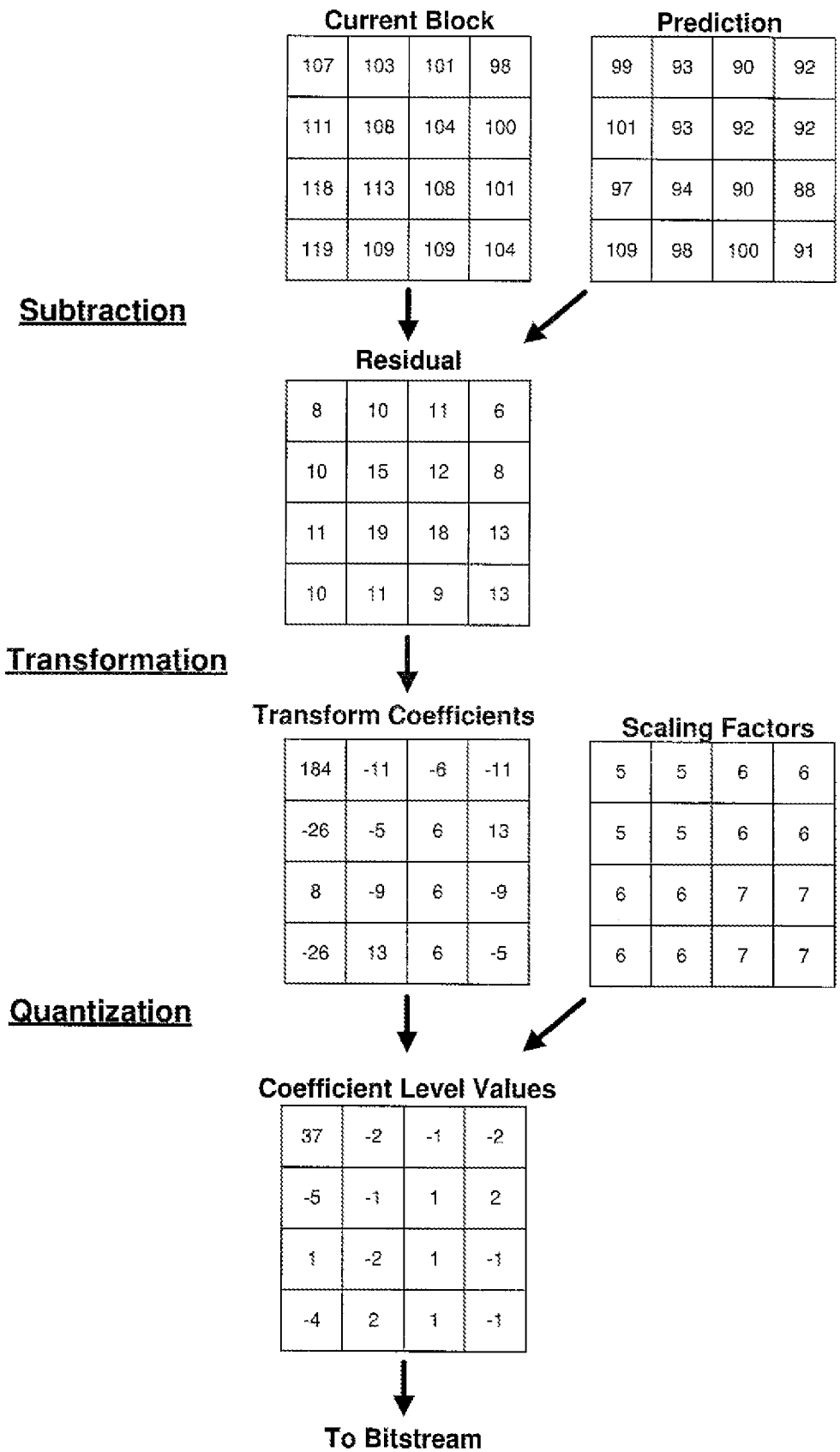
FIG. 3A is a conceptual diagram illustrating examples of coding a block of video data in accordance with one or more techniques of this disclosure.
Figure 3B:
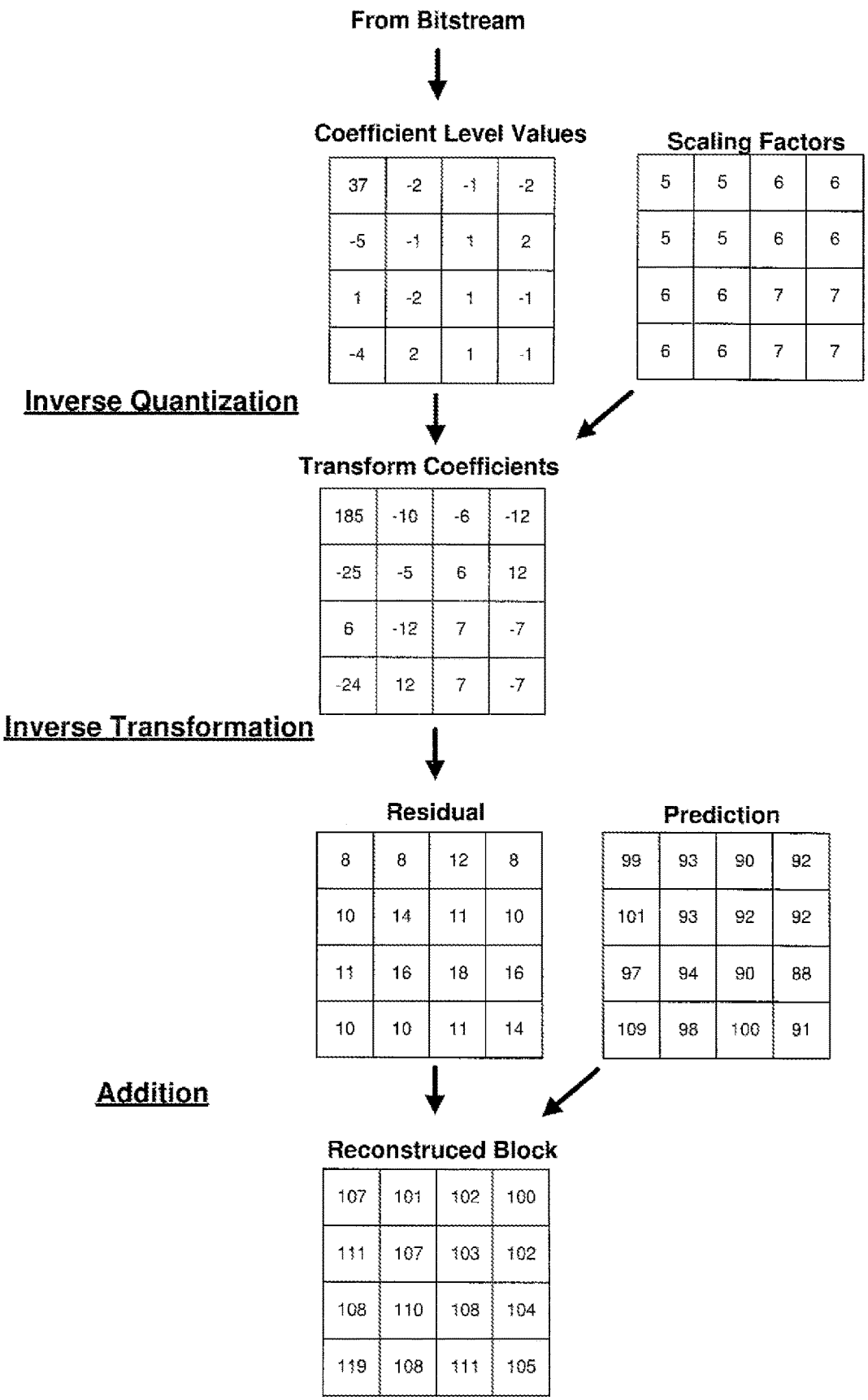
FIG. 3B is a conceptual diagram illustrating examples of coding a block of video data in accordance with one or more techniques of this disclosure.

FIGS. 3A-3B are conceptual diagrams illustrating examples of coding a block of video data. As illustrated in FIG. 3A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 3B, the current block of video data is decoded by performing inverse quantization on level values, performing an inverse transform, and adding a set of prediction values to the resulting residual. It should be noted that in the examples in FIGS. 3A-3B, the sample values of the reconstructed block differs from the sample values of the current video block that is encoded. In this manner, coding may be said to be lossy. However, the difference in sample values may be considered acceptable or imperceptible to a viewer of the reconstructed video. Further, as illustrated in FIGS. 3A-3B, scaling is performed using an array of scaling factors.

As illustrated in FIG. 3A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, infra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a previously decoded picture, i.e., a reference picture is determined and a motion vector (MV) identifies samples in the reference picture. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., MVx), a vertical displacement component of the motion vector (i.e., MVy), and a resolution for the motion vector (e.g., one-quarter pixel precision, one-half pixel precision, one-pixel precision, two-pixel precision, four-pixel precision). In ITU-T H.265, a motion vector is represented at ¼-pixel precision. Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. In ITU-T H.265, pictures and slices are classified based on which types of prediction modes may be utilized for encoding video blocks thereof. That is, for slices having a B type (i.e., a B slice), bi-prediction, uni-prediction, and infra prediction modes may be utilized, for slices having a P type (i.e., a P slice), uni-prediction, and intra prediction modes may be utilized, and for slices having an I type (i.e., an I slice), only intra prediction modes may be utilized. As described above, reference pictures are identified through reference indices. In ITU-T H.265, for a P slice, there is a single reference picture list, RefPicList0 and for a B slice, there is a second independent reference picture list, RefPicList1, in addition to RefPicList0. It should be noted that for uni-prediction in a B slice, one of RefPicList0 or RefPicList1 may be used to generate a prediction. Further, it should be noted that in ITU-T H.265, during the decoding process, at the onset of decoding a picture, reference picture list(s) are generated from previously decoded picture stored in a decoded picture buffer (DPB).

Further, a coding standard, such as, for example ITU-T H.265, may support motion vector prediction. Motion vector prediction enables the value of a motion vector to be derived based on another motion vector. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP). ITU-T H.265 supports two modes for motion vector prediction: a merge mode and so-called Advanced Motion Vector Prediction (AMVP). In ITU-T H.265, for both the merge mode and the AMVP for a current PB, a set of candidate blocks is derived. Both a video encoder and video decoder perform the same process to derive a set of candidates. Thus, for a current video block, the same set of candidates is generated during encoding and decoding. A candidate block includes a video block having associated motion information from which motion information used to generate a prediction for a current video block can be derived. For the merge mode in ITU-T H.265, all motion information (i.e., motion vector displacement values, reference picture indices, and reference picture lists) associated with a selected candidate is inherited as the motion information for the current PB. That is, at a video encoder, a candidate block is selected from the derived set of candidates and an index value included in the bitstream indicates the selected candidate and thus, indicates the motion information for the current PB. For AMVP in ITU-T H.265, the motion vector information for the selected candidate is used as a motion vector predictor (MVP) for the motion vector of the current PB. That is, at a video encoder, a candidate block is selected from the derived set of candidates and an index value indicating the selected candidate and a delta value (i.e., a motion vector delta (MVD)) indicating the difference between the motion vector predictor and the motion vector for the current PB are included in the bitstream. Further, for AMVP in ITU-T H.265, syntax elements identifying a reference picture are included in the bitstream.

In ITU-T H.265, a set of candidate blocks may be derived from spatial neighboring blocks, and temporal blocks. Further, generated (or default) motion information may be used for motion vector prediction. In ITU-T H.265, whether motion information used for motion vector prediction of a current PB includes motion information associated with spatial neighboring blocks, motion information associated with temporal blocks, or generated motion information is dependent on the number of candidates to be included in a set, whether temporal motion vector prediction is enabled, the availability of blocks, and/or whether motion information associated with blocks is redundant.

Figure 4:
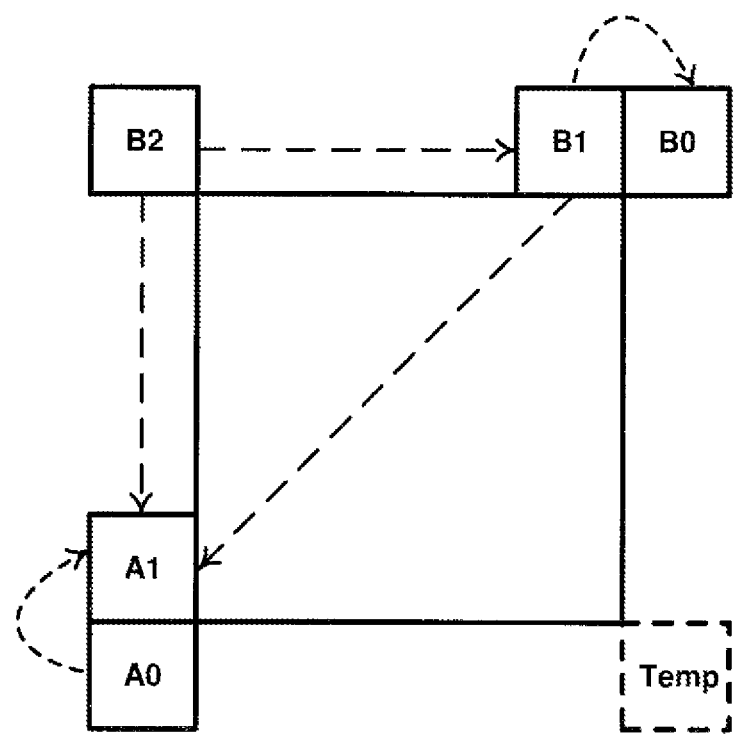
FIG. 4 is a conceptual diagram illustrating the position of neighboring video blocks for inclusion in a set of candidate for motion vector predictors in accordance with one or more techniques of this disclosure.

For the merge mode in ITU-T H.265, a maximum number of candidates that may be included in a set of candidate blocks may be set and signaled by a video encoder and may be up to five. Further, a video encoder may disable the use of temporal motion vector candidates (e.g., in order to reduce the amount memory resources needed to store motion information at a video decoder) and signal whether the use of temporal motion vector candidates is enabled or disabled for a picture. FIG. 4 illustrates the position of spatial neighboring blocks and the temporal block that may be included in a set of candidate blocks for the merge mode in ITU-T H.265. The derivation of the set of candidates for merge mode in ITU-T H.265 includes determining the availability of A1, B1, B0, A0, and B2. It should be noted that a block is considered unavailable, if it is intra-predicted (i.e., does not have corresponding motion information) or is not included in the current slice (or tile). After determining the availability of A1, B1, B0, A0, and B2, a set of comparisons (illustrated as dashed arrows in FIG. 4) is performed to remove redundant entries from the set of candidates. For example, B2 is compared to B1 and if B1 has associated motion information that is equal to that of B2, it is removed from the set of candidates. The removal of entries from a set of candidates may be referred to as a pruning process. It should be noted that in FIG. 4, in order to reduce complexity, a complete comparison of candidates is not performed (e.g., A0 is not compared to B0) and as such, it is possible that redundant entries are included in the set of candidates.

Referring again to FIG. 4, the dashed block labeled Temp refers to the temporal candidate that may be included in the set of candidates. In ITU-T H.265 for merge mode, for the temporal candidate, a spatially collocated PU included in a reference picture is defined and the temporal candidate includes a block having a position just outside to the bottom right of the collocated PU, if available, or the block at the center position of the collocated PU. As described above, a maximum number of candidates that may be included in a set of candidate blocks is set. If the maximum number of candidates is set to N, N−1 spatial candidates and the temporal candidate are included in the set, in cases where the number of available spatial candidates (after pruning) and temporal candidate is greater than or equal to N. In cases where the number of available spatial candidates (after pruning) and temporal candidate is less than N, generated motion information is included in the set in order to fill the set.

Figure 5:
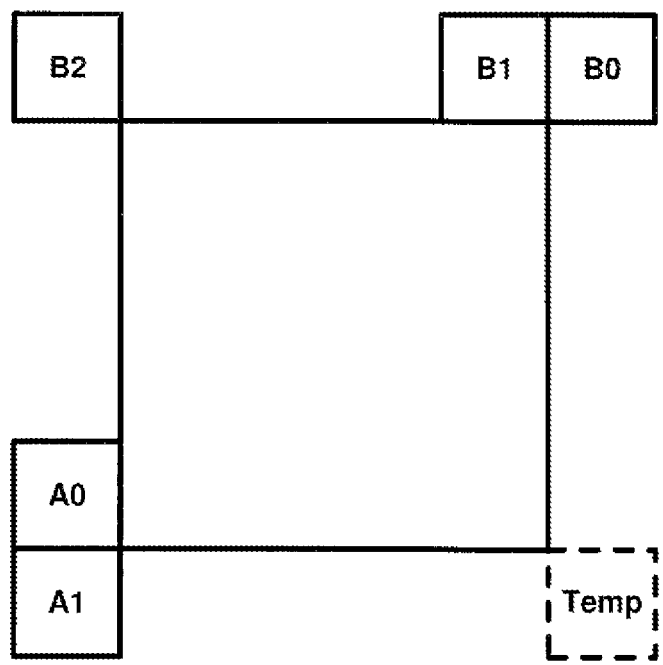
FIG. 5 is a conceptual diagram illustrating the position neighboring video blocks for inclusion in a set of candidate motion vector predictors in accordance with one or more techniques of this disclosure.

For AMVP in ITU-T H.265, referring to FIG. 5, the derivation of the set of candidates includes adding one of A0 or A1 a left candidate) and one of B0, B1 or B2 (an above candidate) to the set based on their availability. That is, the first available left candidate and the first available above candidate are added to the set. When the left candidate and the above candidate have redundant motion vector components, one redundant candidate is removed from the set. If the number of candidates included in the set is less than two, and temporal motion vector prediction is enabled, the temporal candidate (Temp) is included in the set. In cases where the number of available spatial candidates (after pruning) and temporal candidate included in the set is less than two, a zero value motion vector is included in the set in order to fill the set.

JEM describes a special merge mode, a so-called pattern matched motion vector derivation (PMMVD) mode, based on Frame-Rate Up Conversion (FRUC) techniques. In the PMMVD mode, both a video encoder and video decoder perform the same process to derive motion information of a video block. In some cases, in JEM a QTBT leaf node may be referred to as a CU. In JEM, a CU-level merge flag indicates whether motion vector information for the CU is derived using a merge mode. Further, in order to indicate that the PMMVD mode is to be used to derive motion information, when the merge flag is TRUE for a CU, a so-called FRUC flag is additionally signaled for the CU. When the FRUC flag is FALSE, a merge index is signaled and the regular merge mode is used to indicate motion information for the CU. When the FRUC flag is TRUE, a FRUC mode flag is additionally signaled to indicate whether one of a defined template matching technique or a defined bilateral (or bi-lateral) matching technique is to be used to derive motion information for sub-blocks within the CU. In JEM, each of the defined template matching technique and the defined bilateral matching technique derive an initial CU-level motion vector. After the initial CU-level motion vector is determined, the current CU is divided into sub-blocks and a motion vector is derived for each sub-block using the initial CU-level motion vector.

Figure 6:
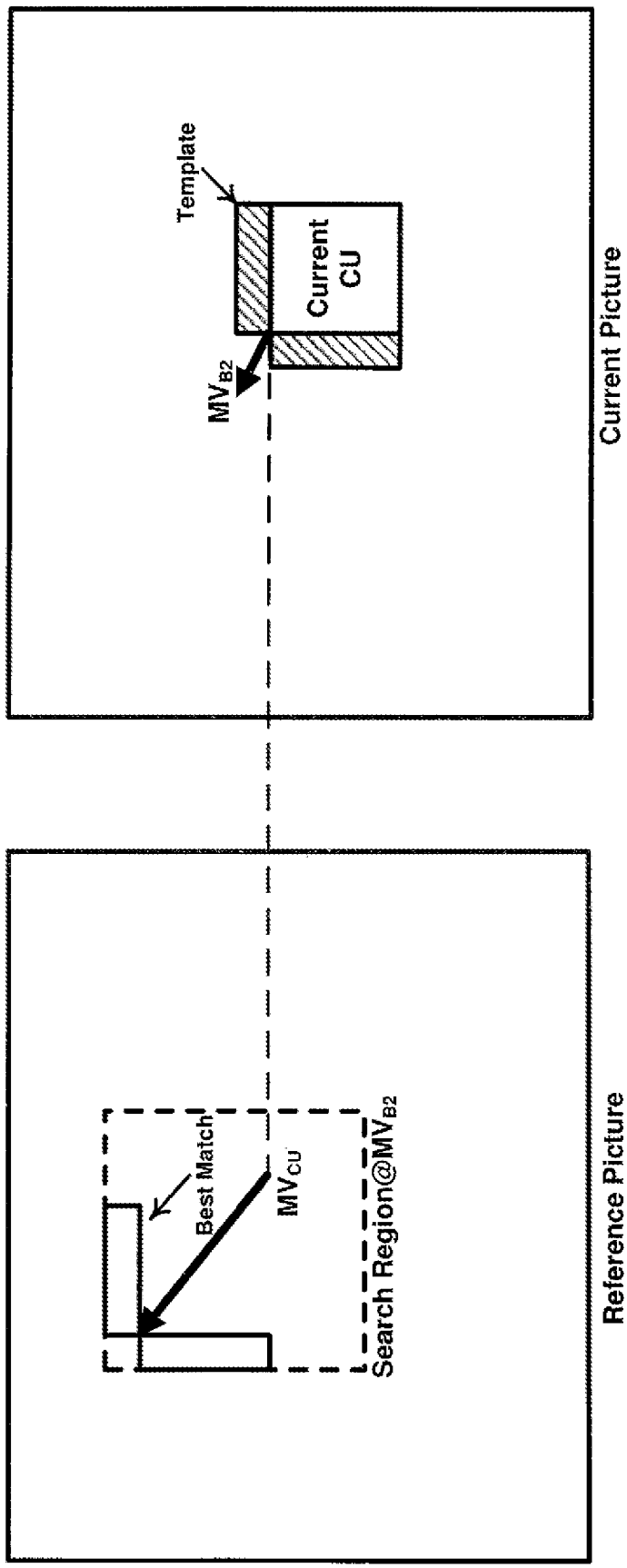
FIG. 6 is a conceptual diagram illustrating the use of template matching for deriving motion information for a current video block in accordance with one or more techniques of this disclosure.

FIG. 6 illustrates the use of template matching for deriving a CU-level motion vector. In template matching, a template is defined, where a template indicates the positions of samples to be included in a set of samples. For a current video block, according to the template, a set of sample values in the current picture corresponding to the current video block are determined. For example, for an N×M current video block, a template may specify that for each of the N columns, the X samples neighboring the top row of the current video block and for each of the M rows, the Y samples neighboring the left column of the current video block are to be included in the set of samples. That is, for example, referring to FIG. 6, for the current CU, a template may be an inverse L-shape including neighboring above and left samples.

Template matching is used to derive motion information for a current video block by determining the best match between the sample values in the current picture corresponding to the template and the current video block and a set of sample values positioned within a reference picture corresponding to the template. In JEM, for template matching the absolute sum difference (SAD) of corresponding samples is used to determine the degree to which two sets match, where lower values of the SAD indicate a better match. To search for sets of sample values positioned within a reference picture that may provide a good match, origin points and search patterns are used. Template matching techniques may use one or more sets of motion vector candidates to determine origin points. For example, the each of the motion vectors in the set of motion vector candidates {A1, B1, B0, A0, and B2} described above with respect to merge mode in ITU-T H.265 may be used as an origin point in a reference picture. For example, referring to FIG. 6, for the current CU, the candidate motion vector B2 (illustrated as $MV_{B2}$) is used as an origin point in reference picture. A region corresponding to an origin point is searched for the set of samples that provides the best match. That is, a search may be performed according to a search pattern initiated with respect to an origin point. For example, if an origin point is $(x_0, y_0)$ a search pattern may include evaluating sets of samples having the shape of the template located at the following positions: $(x_0-4, y_0)$; $(x_0+4, y_0)$; $(x_0, y_0-4)$ and $(x_0, y_0+4)$. In the example illustrated in FIG. 6, $MV_{B2}$ forms the center of a search region and the set of samples at a position within the search region having the best match is indicated. As further illustrated in FIG. 6, a potential CU-level motion vector (i.e., $MV_{CU}$) is determined from the relative position of the set of samples having the best match and the position of the current CU. The process illustrated in FIG. 6, may be performed using each motion vector in the input set of candidate motion vectors as an origin point and the CU-level motion vector for the current CU may be selected from the potential CU-level motion vectors according to which potential CU-level motion vector provides the best match. As described above, in JEM, after the initial CU-level motion vector is determined, the current CU is divided into sub-blocks and a motion vector is derived for each sub-block by performing a sub-block level iteration of template matching. The sub-block iteration of template matching uses the initial CU-level motion vector as input and may be referred to as a motion vector refinement process.

It should be noted that in JEM, in cases where a candidate neighboring video block is predicted using bi-prediction, template matching is applied independently to the first reference picture and the second reference picture. Thereafter, it is determined whether one of a uni-prediction (one motion vector referencing one of the first reference picture or the second reference picture) or bi-prediction (one motion vector referencing the first reference picture and one motion vector referencing the second reference picture) will be used to generate a prediction for the current video block.

Figure 7:
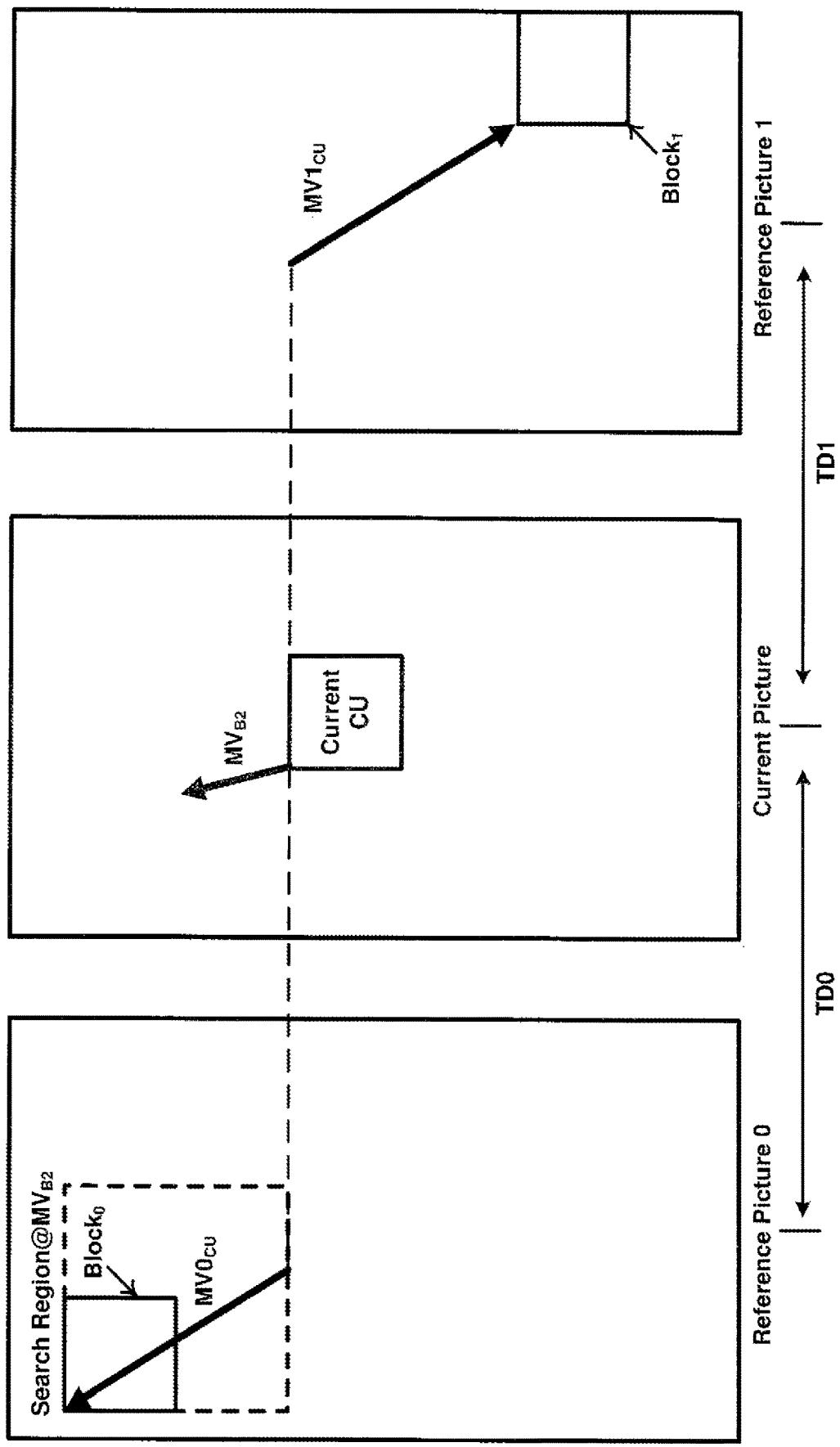
FIG. 7 is a conceptual diagram illustrating the use of bilateral matching for deriving motion information for a current video block in accordance with one or more techniques of this disclosure.

FIG. 7 illustrates the use of bilateral matching for deriving a CU-level motion vector. Bilateral matching is used to derive motion information for a current video block by finding the closest match between two corresponding blocks in two different reference pictures located along a motion trajectory. A motion trajectory may include a motion vector, MV0, pointing to a reference block in a reference picture at a temporal distance, TD0, from a current picture, and a motion vector, MV1, pointing to a reference block in a reference picture at a temporal distance, TD1 from a current picture. For example, the reference picture at TD0 may be the temporal preceding picture to the current picture (which may be referred to as the backward picture) and the reference picture TD1 may be the temporal subsequent picture to the current picture (which may be referred to as the forward picture). It should be noted that in ITU-T H.265 and JEM, each picture is assigned a picture order count (POC) value indicated a temporal position of the picture and temporal distances may be determined as the difference between POC values. Further, it should be noted that in JEM, under the assumption of continuous motion trajectory, the motion vectors MV0 and MV1 pointing to the two reference blocks shall be proportional to the temporal distances, i.e., TD0 and TD1, between the current picture and the two reference pictures.

Similar to template matching, bilateral matching may use one or more sets of motion vector candidates at inputs and each motion vector candidate may be used as an origin point in a reference frame. For example, referring to FIG. 7, for a current CU, the candidate motion vector B2 (i.e., $MV_{B2}$) is used as an origin point in the backward reference picture. Similar to template matching, a search may be performed according to a search pattern initiated with respect to an origin point to identify blocks of sample values in a reference picture. Further, in a manner similar to determining a potential CU-level motion vector in template matching described above, a potential CU-level backward prediction motion vector (i.e., $MV0_{CU}$ in FIG. 7) may be determined from the relative position of a block of sample values (i.e., Block0 in FIG. 7) and the position of the current CU. For each potential CU-level backward motion vector, a corresponding forward motion vector is generated. Typically, the corresponding forward motion vector is generated as a motion vector having the same absolute value and reverse direction of the backward motion vector and is further scaled proportionally based on the temporal distances of TD0 and TD1. The corresponding forward motion vector indicates a corresponding block of sample values (i.e., Block$_1$ in FIG. 7). In JEM, the SAD of corresponding samples in Block0 and Block$_1$ is used to determine the degree to which the two blocks match for determining the CU-level motion vectors MV0 and MV1. In JEM, for each origin point, potential motion vectors MV0 and MV1 are determined based on the best match between a block in the TD0 reference picture (e.g., Block0 in FIG. 7) and a block in the TD1 reference picture (e.g., Block$_1$ in FIG. 7) within a search region. The initial CU-level motion vectors MV0 and MV1 are selected from the potential motion vectors MV0 and MV1 according to the best match of corresponding blocks. As described above, in JEM, after the initial CU-level motion vector is determined, the current CU is divided into sub-blocks and a motion vector is derived for each sub-block by performing a sub-block level iteration of bilateral matching. That is, for each sub-block, $MV0_{CU}$ is used as an origin point in the backward reference picture and a corresponding search region (i.e., search pattern) is used to determine the motion vectors MV0 and MV1 for each sub-block.

As described above, multiple descriptions of video coding were proposed by various groups at the 10$^{th}$ Meeting of ISO/IEC JTC1/SC29/WG11, 16-20 Apr. 2018, San Diego, CA "Description of SDR video coding technology proposal by MediaTek," ISO/IEC JTC1/SC29/WG11 Document: 1VET-J0018, 10$^{th}$ Meeting 16-20 Apr. 2018, San Diego, CA (hereinafter "J0018") describes a motion vector prediction merge mode where motion vector candidates may include four temporal candidates having the following temporal collocated positions with respect to a current video block: a right bottom position candidate, a center position candidate, a left bottom position candidate, and a right top position candidate.

"Description of SDR, HDR and 360° video coding technology proposal by Qualcomm and Technicolor—low and high complexity versions," ISO/IEC JTC1/SC29/WG11 Document: JVET-J0021, 10$^{th}$ Meeting 16-20 Apr. 2018, San Diego, CA (hereinafter "J0021") describes a motion vector prediction merge mode where motion vector candidates may include adjacent and non-adjacent spatial candidates. J0021 further describes where adjacent spatial candidates are ordered in the merge candidate list according to bi-prediction candidates being ordered before uni-prediction candidates. As described above, in ITU-T H.265, a maximum number of merge candidates is defined and merge candidates are indexed within a merge candidate list. Merge candidates placed at the top of the order list are more likely to be included in a list regardless of the maximum number of merge candidates and have a lower index value, which typically can be signaled using fewer bits (e.g., if a unary binarization is used for an index value).

"Description of SDR, HDR and 360° video coding technology proposal considering mobile application scenario by Samsung, Huawei, GoPro, and HiSilicon," ISO/IEC JTC1/SC29/WG11 Document: JVET-J0024, 10$^{th}$ Meeting 16-20 Apr. 2018, San Diego, CA (hereinafter "J0024") describes a motion vector prediction technique utilizing Adaptive Motion Vector Resolution (AMVR). As described above, in ITU-T H.265, a motion vector is represented with ¼-pixel (or pel) precision. In AMVP, in ITU-T H.265, because the motion vector of the video current block and the motion vector predictor are represented with ¼-pel precision, the motion vector difference is also represented with ¼-pel precision. Further, in ITU-T H.265, for bi-prediction, the x-component (MVDx) and the y-component (MVDx) for each prediction direction are signaled independently. The AMVR technique proposed in J0024, supports multiple motion vector resolutions and signaling one or both of MVDx and MVDy. In particular, the AMVR technique proposed in J0024 supports the following motion vector resolutions: ¼-pixel, ½-pixel, 1-pixel, 2-pixel and 4-pixel). In the AMVR technique described in J0024, a MVR Index is signaled at the CU level with MVD information to indicate the motion vector resolution, R, and a motion vector predictor, as provided in Table 1.

TABLE 1

| | MVR Index | | | | |
|---|---|---|---|---|---|
| | 0 | 1 | 2 | 3 | 4 |
| Resolution (R) in pel | ¼ | ½ | 1 | 2 | 4 |
| N$^{th}$ MVP | 1$^{st}$ MVP | 2$^{nd}$ MVP | 3$^{rd}$ MVP | 4$^{th}$ MVP | 5$^{th}$ MVP |

J0024 provides the following equations for adjusting MV (MVx, MVy), MVP (MVPx, MVPy) and MVD (MVDx, MVDy) by the resolution R:

$$(MV_x, MV_y)=(Round(MV_x/(R*4))*4), Round(MV_y/(R*4))*(R*4))$$

$$(MVP_x, MVP_y)=(Round(MVP_x/(R*4))*(R*4), Round(MVP_y/(R*4))*(R*4))$$

$$(MVD_x, MVD_y)=(MV_x-MVP_x)/(R*4),(MV_y-MVP_y)/R*4))$$

Further, J0024 provides where in the case of bi-prediction, there are three possible signal modes for signaling MVDx, MVDy for each prediction direction. That is, J0024 provides where an AMVR Bi-Index value indicates whether the MVDx, and MVDy for each reference list (list 0 or list 1) are signaled or not, as provided in Table 2. It should be noted that when a MVDx, MVDy are not signaled, they are inferred to be equal to (0,0).

TABLE 2

| AMVR Bi-Index | (MVD$_x$, MVD$_y$) of list 0 | (MVD$_x$, MVD$_y$) of list 1 |
|---|---|---|
| 0 | Signaled | Signaled |
| 1 | Not signaled | Signaled |
| 2 | Signaled | Not signaled |

As described above, in ITU-T H.265, for bi-prediction, the x-component (MVDx) and the y-component (MVDx) for each prediction direction are signaled independently. "Symmetrical mode for bi-prediction," ISO/IEC JTC1/SC29/WG11 Document: JVET-J0063, 10$^{th}$ Meeting 16-20 Apr. 2018, San Diego, CA (hereinafter "J0063") describes where only motion information (an MVP Index, MVD, and a reference picture index) for list 0, and an MVP Index for list 1 are explicitly signaled. The reference index and MVD for the list 1 are derived based on the assumption of linear motion. In particular, in J0063, in the case of bi-prediction, a symmetrical mode flag indicating whether symmetrical mode is used or not is explicitly signaled. When the flag is true, only an MVP Index for list 1 is signaled, and the reference index and MVD for list 1 are derived from motion information of list 0. In J0063, the reference index for list 1, ref_idx_l1, is determined by searching for a reference picture in list 1, which is mirrored with the reference picture for list 0. If such a picture is not present in list 1, the nearest temporal reference picture to current picture opposite in temporal direction to the list 0 reference picture is used. After the reference picture in list 1 is determined, MVD for list 1, MVD1 is derived by scaling MVD for list 0, MVD0. In J0063, the scaling factor is calculated according following formula:
Where, $$MVD1 = \frac{POC_{CUR} - POC_{list1}}{POC_{CUR} - POC_{list0}} \times MVD0$$

$POC_{CUR}$ is the POC value of the current picture,
$POC_{list0}$ is the POC value of the list 0 reference picture, and
$POC_{list1}$ is the POC value of the list 1 reference picture.

As described above, a motion vector is typically expressed as a horizontal displacement component (i.e., MVx) and a vertical displacement component (i.e., MVy). J0024 provides a mechanism for expressing a motion vector according to a starting point, a motion magnitude, and a motion direction. In particular, J0024 provides where candidate motion vector may form a starting point and is signaled according to an index value as provided in Table 3. A distance index indicates a pre-defined distance from a starting point information and is signaled according to an index value as provided in Table 4, and a direction index represents one of the four directions of a MVD from the starting point and is signaled according to an index value as provided in Table 5.

TABLE 3

| | Base candidate IDX | | | |
|---|---|---|---|---|
| | 0 | 1 | 2 | 3 |
| $N^{th}$ MVP | $1^{st}$ MVP | $2^{nd}$ MVP | $3^{rd}$ MVP | $4^{th}$ MVP |

TABLE 4

| Distance IDX | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

TABLE 5

| | Direction IDX | | | |
|---|---|---|---|---|
| | 00 | 01 | 10 | 11 |
| x-axis | + | − | N/A | N/A |
| y-axis | N/A | N/A | + | − |

According to the techniques described herein additional motion vector prediction techniques are provided. The motion vector prediction techniques provided herein may utilize techniques for deriving a paired set bi-prediction motion vectors described herein, techniques for adaptive motion vector resolution described herein, techniques for motion vector difference signaling described herein, and/or techniques for deriving non-adjacent spatial candidates described herein.

Figure 8:
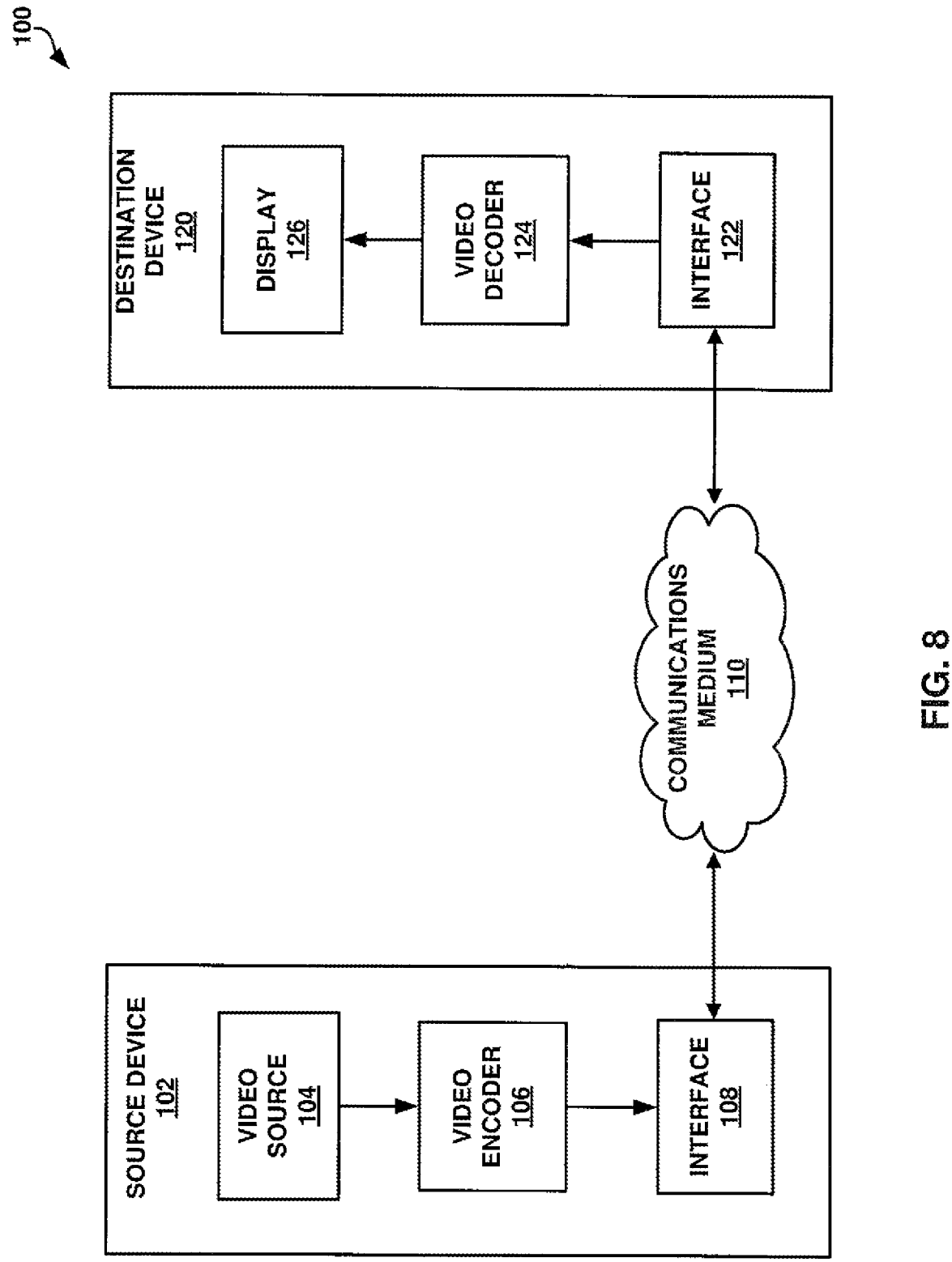
FIG. 8 is a block diagram illustrating an example of a system that may be configured to encode and decode video data according to one or more techniques of this disclosure.

FIG. 8 is a block diagram illustrating an example of a system that may be configured to code (i.e., encode and/or decode) video data according to one or more techniques of this disclosure. System 100 represents an example of a system that may perform video coding using motion vector prediction techniques described according to one or more examples of this disclosure. As illustrated in FIG. 8, system 100 includes source device 102, communications medium 110, and destination device 120. In the example illustrated in FIG. 8, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure. Digital (SD) memory card), internal/external hard disk drives, and/or internal/external solid state drives. Data may be stored on a storage device according to a defined file format.

Referring again to FIG. 8, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component. Interconnect Express (PCIe) bus protocols, proprietary bus protocols, Universal Serial Bus (USB) protocols, I2C, or any other logical and physical structure that may be used to interconnect peer devices.

Referring again to FIG. 8, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 8, video decoder 124 is described as outputting data to display 126, video decoder 124 may be configured to output video data to various types of devices and/or sub-components thereof. For example, video decoder 124 may be configured to output video data to any communication medium, as described herein.

Figure 9:
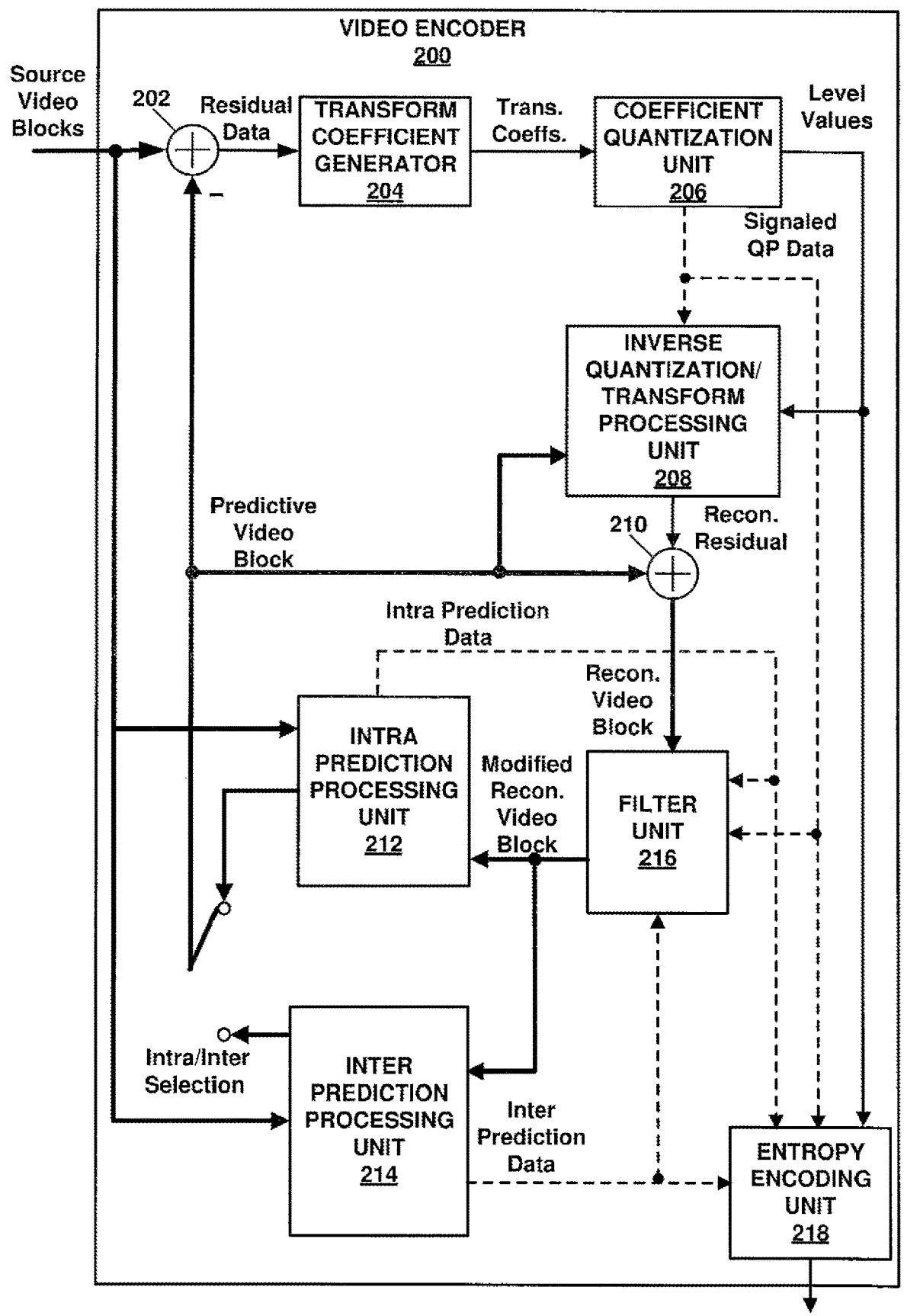
FIG. 9 is a block diagram illustrating an example of a video encoder that may be configured to encode video data according to one or more techniques of this disclosure.

FIG. 9 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 9, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional subdivisions of source video blocks. It should be noted that some techniques described herein may be generally applicable to video coding, regardless of how source video data is partitioned prior to and/or during encoding. In the example illustrated in FIG. 9, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 9, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 9, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 9, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to evaluate a frame and/or an area thereof and determine an intra prediction mode to use to encode a current block. As illustrated in FIG. 9, intra prediction processing unit 212 outputs intra prediction data (e.g., syntax elements) to entropy encoding unit 218 and transform coefficient generator 204. As described above, possible intra prediction modes may include planar prediction modes, DC prediction modes, and angular prediction modes. Inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 9). It should be noted that inter prediction processing unit 214 may further be configured to apply one or more interpolation filters to a reconstructed residual block to calculate sub-integer pixel values for use in motion estimation. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. Inter prediction processing unit 214 may output motion prediction data for a calculated motion vector to entropy encoding unit 218.

As described above, motion information may be determined and specified according to motion vector prediction techniques. Inter prediction processing unit 214 may be configured to perform motion vector prediction techniques, including for example, those described above. Further, inter prediction processing unit 214 may be configured to perform motion vector prediction according to techniques described below. In particular, inter prediction processing unit 214 may be configured to derive a paired set of bi-prediction motion vectors. A derived paired set of bi-prediction motion vectors may be included in a set of motion vector prediction candidates.

In one example, according to the techniques herein, inter prediction processing unit 214 may be configured to derive a motion vector MV1, from a motion vector MV0, and thus derive a paired set of motion vectors, MV0 and MV1. It should be noted that in one example, MV0 may be selected from a uni-prediction motion vector candidate or as one motion vector from a bi-prediction motion vector candidate. A selected motion vector MV0 (MV0x, MV0y) includes a corresponding reference picture, ref0. ref0 may be included in a reference picture list and be associated with a POC value, POC0. POC0 may be used to derive a POC value, POC1, for the reference picture, ref1, corresponding to MV1 as follows:

POC1=2*POC$_{Cur}$−POC0,

Where,

POC$_{Cur}$ is the POC value of the current picture.

It should be noted that there may be cases where ref1 is required to be selected from a reference picture list (e.g., reference list 1) and a reference picture having POC1, as derived above, is not included in the reference picture list. In such cases, ref1 may be selected as the reference picture included in the reference picture list which has a POC value that is closest to POCCur. Further, if two pictures have POC values that are equally close to POCCur, the picture with a POC value most distant from POC0 may be selected.

After POC1 is determined, MV1 may be set to (a$_1$*MV0x, a$_1$*MV0y) where a$_1$ is determined as follows:

$$a1 = \frac{POC_{CUR} - POC1}{POC_{CUR} - POC0};$$

It should be noted that in some cases, a$_1$ may be set to 1 or −1, e.g., according to a flag (e.g., a flag included in a parameter set or a slice header). For example, a flag may indicate a$_1$=−1, when POCcur−POC1 and POCcur−POC0 have a different sign value and a$_1$=1, when POCcur−POC1 and POCcur−POC0 have the same sign value.

In one example, MV0 may be used as an origin point and a motion vector, MV0'=(MV0x+offset_x, MV0y+offset_y), may be derived according to a template or bilateral matching technique, for example, those described above. In one example, once MV0' is derived, according to the technique above, a motion vector MV1' would be equal to (a$_1$* (MV0x+offset_x), a$_1$*(MV0y+offset_y)). In one example, offset_x and offset_y may be signaled to a video decoder. Further, in one example, offset_x and offset_y may be derived by a video decoder using MV0 as an origin point and performing the template or bilateral matching technique performed by a video encoder.

In one example, according to the techniques herein, inter prediction processing unit 214 may be configured to derive a paired set of motion vectors, MV0' and MV1' from a paired set of motion vectors, MV0 and MV1. In one example, MV0 (MV0x, MV0y) having corresponding reference picture ref0 and MV1 (MV1x, MV1y) having corresponding reference picture ref1 may be inherited from a bi-prediction motion vector candidate. In one example, MV0' and MV1' may be derived as follows:

MV0'=(MV0$_x$+offset_x, MV0$_y$+offset_y);

MV1'=(MV1$_x$+a$_1$*offset_x, MV1$_y$+a$_1$*offset_y);

$$a1 = \frac{POC_{CUR} - POC1}{POC_{CUR} - POC0};$$

Where,
POC1 is the POC of ref1; and
offset_x and offset_y are determined by applying, for example, a template or bilateral matching technique using MV0 as an origin point.

It should be noted that in one example, for a bi-prediction candidate, whether a video decoder derives a paired set of motion vectors by selecting one of the motion vectors from a bi-prediction motion vector candidate (i.e., derives MV0' and MV1' from the selected motion vector MV0 (MV0x, MV0y)) or derives a paired set of motion vectors from both motion vectors of the bi-prediction motion vector candidate, according to the techniques above, may be determined based on explicit signaling. For example, an index value identifying a bi-prediction motion vector candidate may be signaled and an associated flag may indicate whether one of the motion vectors from the bi-prediction motion vector candidate or both motion vectors of the bi-prediction motion vector candidate are used to determine MV0' and MV1'. Further, in the case where one of the motion vectors from the bi-prediction motion vector candidate is used, which of the motion vectors is used may be indicated (a flag indicating MV0 or MV1) or inferred (e.g., use MV0). Further, in one example, for a bi-prediction motion vector candidate (MV0 and MV1) and MV0' equal to (MV0x+offset_x, MV0y+offset_y), a video decoder may determine whether MV1' used for motion vector prediction is ($a_1$*(MV0x+offset_x), $a_1$*(MV0y+offset_y)) or (MV1x+$a_1$*offset_x, MV1y+$a_1$*offset_y) by performing template or bilateral matching for each derivation of MV1'. In one example, a video decoder may determine whether MV1' used for motion vector prediction is ($a_1$*(MV0x+offset_x), $a_1$*(MV0y+offset_y)) or (MV1x+$a_1$*offset_x, MV1y+$a_1$*offset_y) based on whether a picture having POC1=2*POCCur−POC0 is available in a reference list, in such a case MV1' may be determined according to (MV1x+$a_1$*offset_x, MV1y+$a_1$*offset_y). Further, in one example, the difference between MV0 and MV1 may be determined and one of the techniques for determining MV1' may be selected based on whether the absolute difference is greater than a threshold value. In one example, the sign values (or directions) of MV0 and MV1 may be compared and if MV0 and MV1 have the same sign, MV1' may be determined according to ($a_1$*(MV0x+offset_x), $a_1$*(MV0y+offset_y)).

In one example, according to the techniques herein, inter prediction processing unit 214 may be configured to adjust the resolution of a MVP and/or a MVD value locally. For example, inter prediction processing unit 214 may determine the MVP and/or a MVD value for a CU according to a derivation process and explicitly signal the resolution of MVP and/or a corresponding MVD value. It should be noted that in one example, each of the resolutions of the MVP and MVD may be signaled independently and in some examples, one of the resolutions of the MVP and MVD may be signaled and the resolution of the MVP (or MVD) may be adjusted based on the resolution of the MVD (or MVP). In one example, inter prediction processing unit 214 may be configured to explicit signal the resolution of a MVP and/or a corresponding MVD value index value at a CTU/CU level that indicates the MV resolution. For example, the following indices with corresponding resolutions may be represented by corresponding syntax elements values:

MVP_resolution_idx: ¼, ½, 1, 2, 4, 8

MVD_resolution_idx: ¼, ½, 1, 2, 4

In one example, if the current CU is coded using a Skip/Merge mode, MVP_resolution_idx is signaled and MVD_resolution_idx is not signaled. In one example, if the current CU is coded using a AMVP mode, both MVP_resolution_idx and MVD_resolution_idx may be present in a bitstream.

As described above, inter prediction processing unit 214 may be configured to perform motion vector prediction using a derived paired set of bi-prediction motion vectors. In one example, inter prediction processing unit 214 may be configured to perform motion vector prediction using a so-called bi-merge mode. In one example, according to a bi-merge mode, inter prediction processing unit 214 may derive a set of candidates for merge mode according to the techniques described above with respect to FIG. 4 or another technique for deriving a set of merge mode candidates. Inter prediction processing unit 214 may reorder the set of candidates such that all bi-prediction candidates are ordered higher on the candidate list. For each, uni-prediction candidate, a paired set of motion vectors may be derived, for example, according to the technique described above. In one example, each uni-prediction candidate may be replaced in the candidate list with its derived paired set of motion vectors. In one example, the derived paired set of motion vectors may be added to the list. In one example, the derived paired set of motion vectors may be added to the list and may be ordered higher in the list than the uni-prediction candidates. Inter prediction processing unit 214 may be configured to select a candidate and signal the selected candidate according to an index value. It should be noted, that as described above, bi-prediction is not enabled for P slices. In one example, for a P slice, the list of candidates including the bi-prediction candidates may be derived and one of the predictions for each bi-prediction candidates may be removed (e.g., all list 1 candidates). In one example, in bi-merge mode, offset values and MVD values are not signaled. However, in one example, a video decoder, may perform a motion vector refinement for selected candidate, e.g., according to a template matching or bilateral matching.

As described above, for AMVP in ITU-T H.265, a candidate block is selected from the derived set of candidates and an index value indicating the selected candidate and a delta value indicating the difference between the motion vector predictor and the motion vector for the current PB are included in the bitstream. In one example, inter prediction processing unit 214 may be configured to perform motion vector prediction using a so-called Bi-AMVP mode. According to a Bi-AMVP modes, only bi-prediction is allowed for generating a prediction for a current block. That is, in a Bi-AMVP mode, for a current video block, a first motion vector and a second motion vector are used to generate a prediction. That is, a first motion vector for a current block may be equal to mvp0+mvd0 and a second motion vector for a current block may be equal to mvp1+mvd1, where mvpX is a motion vector predictor and mvdX is a delta value. According to the techniques herein there may be several ways mvp0, mvd0, mvp1, and mvd1 and the corresponding reference pictures are derived/signaled. That is, there may be several types of Bi-AMVP modes.

It should be noted that for AMVP in ITU-T H.265, when bi-prediction is used, for each prediction direction, a reference picture is indicated by signaling a reference picture index associated with a constructed reference picture list (e.g., ref_idx_l0 and ref_idx_l1). Further, for AMVP in ITU-T H.265 for B slices, a syntax element (i.e., inter_pred_idc) indicates whether one of a uni-prediction using list0, a uni-prediction using list1, or a bi-prediction is used to generate a prediction for a current block. As described in further detail below, for some types of Bi-AMVP modes for B slices, syntax elements indicating a uni-prediction using list0 or list1 a bi-prediction (e.g., inter_pred_idc in ITU-T H.265) do not need to be and are not signaled. Further, values of inter_pred_idc may have different interpretations depending on the Bi-AMVP mode. A particular Bi-AMVP mode may be derived by a video decoder by parsing explicit signaling in the bitstream (e.g., syntax element(s) present in a parameter set, slice header, and/or at the CTU or CU level) and/or implicitly derived by coding parameters and/or properties of video data (e.g., CU size, temporal id, partitioning depth, etc.).

In one example, according to a Bi-AMVP mode, inter prediction processing unit 214 may derive an initial set of candidates, for example, according to the techniques described above with respect to FIG. 5 or another technique for deriving a set of motion vector predictor candidates. For each uni-prediction candidate in the initial set of candidates, inter prediction processing unit 214 converts the uni-prediction candidate to a derived paired set of motion vectors, for example, according to the techniques described above. For each, bi-prediction candidate in the initial set of candidates, inter prediction processing unit 214 converts each of MV0 and MV1 to a derived paired set of motion vectors, for example, according to the techniques described above. Thus, the initial candidate list 0 and list 1 are expanded, where the final candidate list 0 and list 1 include a derived pair for each uni-prediction candidate in initial candidate list 0, a first derived pair for the bi-prediction motion vector and a second derived pair for second bi-prediction motion vector. Table 6 illustrates where a final candidate list 0 and a final candidate list 1 are generated based on a uni-prediction motion vector predictor and a bi-prediction motion vector predictor in an initial candidate list. That is, as illustrated in Table 6, for the uni-prediction motion vector predictor $MV_0$, $MV_00$ is added to final candidate list 0 and derived $MV_01^*$ is added to final candidate list 1 and for the bi-prediction motion vector predictor $MV_1$, $MV_10$ and derived $MV_10^*$ are added to final candidate list 0 and derived $MV_11^*$ and $MV_11$ are added to final candidate list 1.

TABLE 6

| Motion Vector Predictor | Motion Vector Predictor Type | Initial Candidate List 0 | Initial Candidate List 1 | Final Candidate List 0 | Final Candidate List 1 |
|---|---|---|---|---|---|
| $MV_0$ ($MV_00$) | Uni | $MV_00$ | N/A | $MV_00$ | $MV_01^*$ |
| $MV_1$ ($MV_10$, $MV_11$) | Bi | $MV_10$ | $MV_11$ | $MV_10$ | $MV_11^*$ |
|  |  | N/A | N/A | $MV_10^*$ | $MV_11$ |

Thus, with respect to the example illustrated in Table 6, for a current video block, a first motion vector may be determined by one of $MV_00$, $MV_10$, or $MV_10^*$ being a first motion vector predictor (e.g., mvp0 is set to one of $MV_00$, $MV_10$, or $MV_10^*$) and a corresponding delta value (e.g., mvd0) and a second motion vector may be determined by one of $MV_01^*$, $MV_11^*$, or $MV_11$ being a second motion vector predictor (e.g., mvp1 is set to one of $MV_01^*$, $MV_11^*$, or $MV_11$) and a corresponding delta value (e.g., mvd1).

In one example of Bi-AMVP mode, one of the selected derived pair may be used to generate a prediction and an index corresponding to a selected derived pair is signaled and one or more MVD values are signaled. In one example, a single MVD value is signaled, for example, an MVD value for MV0 may be signaled. In one example, the MVD for MV1 may be derived based on the MVD value signaled for MV0. For example, in one example, if $MVD_0(MV0x, MV0y)$ is signaled, $MVD_1$ may be derived as follows:

$$MVD_1 = (a_1 * MV0_x, a_1 * MV0_y);$$

$$a1 = \frac{POC_{CUR} - POC1}{POC_{CUR} - POC0};$$

Where,

POC0 is the POC of the picture associated with MV0; and

POC1 is the POC of the picture associated with MV1.

It should be noted that signaling one MVD value and further deriving MVD, according to the techniques above can reduce the bit-rate of coded video, and may work well for deriving a prediction for linear motions in video.

In one example, there may be up to (or at least) six modes (i.e., types) of Bi-AMVP. As described above, a mode may be determined by explicit signaling and/or implicitly. In one example, an index value and/or flag(s) may be signaled (e.g., slice header) to indicate a particular Bi-AMVP mode. Table 7A illustrates an example of six modes of Bi-AMVP. In the example illustrated in Table 7A, the six modes of Bi-AMVP are illustrated based on the prediction unit syntax in ITU-T H.265. That is, inter_pred_idc may indicate one of a uni-prediction using list0, a uni-prediction using list1, or a bi-prediction, ref_idx_1X is a reference picture index indicating a reference picture associated with a constructed reference picture list, mvp_idx_X is a motion vector predictor index (e.g., indicating an entry in a Final Candidate List X), and mvdX is a delta value, which may be determined based on delta coding signaling (e.g., using mvd_coding( ) in ITU-T H.265). It should be noted that the techniques described herein are generally applicable to various AMVP signaling techniques. It should be noted that with respect to Table 7A, list0 may include a forward prediction list and list1 may include a backward prediction list.

TABLE 7A

| Mode | inter_pred_idc | mvp_idx_0 | mvd0 | ref_idx_l0 | mvp_idx_1 | mvd1 | ref_idx_l1 |
|---|---|---|---|---|---|---|---|
| 0 | Inferred to Bi-mode (==2). | Inferred to 0. | Signaled | Inferred to 0. | Inferred to 0. | Equal to $b_1*mvd0$ | Inferred to 0. |
| 1 | Inferred to Bi-mode (==2). | Signaled | Signaled | Inferred to 0. | Signaled | Equal to $b_1*mvd0$ | Inferred to 0. |

TABLE 7A-continued

| Mode | inter_pred_idc | mvp_idx_0 | mvd0 | ref_idx_l0 | mvp_idx_1 | mvd1 | ref_idx_l1 |
|---|---|---|---|---|---|---|---|
| 2 | Signaled (==0) | Signaled | Signaled | Inferred to 0. | mvp1 = $b_1$*mvp0 | Equal to $b_1$*mvd0 | Inferred to 0. |
|   | Signaled (==1) | mvp0 = $b_2$*mvp1 | Equal to $b_2$*mvd1 | Inferred to 0. | Signaled | Signaled | Inferred to 0. |
|   | Signaled (==2) | Signaled | Signaled | Inferred to 0. | Signaled | Equal to $b_1$*mvd0 | Inferred to 0. |
| 3 | Signaled (==0) | Signaled | Signaled | Signaled | mvp1 = $b_1$*mvp0 | Equal to $b_1$*mvd0 | Signaled |
|   | Signaled (==1) | mvp0 = $b_2$*mvp1 | Equal to $b_2$*mvd1 | Signaled | Signaled | Signaled | Signaled |
|   | Signaled (==2) | Signaled | Signaled | Signaled | Signaled | Equal to $b_1$*mvd0 | Signaled |
| 4 | Signaled (==0) | Signaled | Signaled | Signaled | mvp1 = $b_1$*mvp0 | Signaled | Signaled |
|   | Signaled (==1) | mvp0 = $b_2$*mvp1 | Signaled | Signaled | Signaled | Signaled | Signaled |
|   | Signaled (==2) | Signaled | Signaled | Signaled | Signaled | Signaled | Signaled |
|   | Signaled (==0, 1 OR 2) | | | Semantics as provided in ITU-T H.265 | | | |
|   | Signaled (==3) | Signaled | Signaled | Signaled | MV1 = $b_1$*(mvp0 + mvd0) | | Signaled |
|   | Signaled (==4) | MV0 = $b_2$*(mvp1 + mvd1) | Signaled | Signaled | Signaled | Signaled | Signaled |

It should be noted that with respect to Table 7A, b1 and b2 may be determined as follows:

$$b1 = \frac{POC_1 - POC_{CUR}}{POC_2 - POC_{CUR}};$$

$$b2 = \frac{POC_2 - POC_{CUR}}{POC_1 - POC_{CUR}};$$

Where,
$POC_{cur}$ is the POC of the current picture;
POC0 is the POC of the reference picture given by ref_idx_l0; and
POC1 is the POC of the reference picture given by ref_idx_l1.

Table 7B illustrates an example of two additional and/or alternative modes of Bi-AMVP to those illustrated in Table 7A.

TABLE 7B

| Mode | inter_pred_idc | mvp_idx_0 | mvd0 | ref_idx_l0 | mvp_idx_1 | mvd1 | ref_idx_l1 |
|---|---|---|---|---|---|---|---|
| 6 | Inferred to Bi-mode (==2). | Signaled | Signaled | Inferred to 0. | Equal to mvp_idx_0 | Equal to $b_1$*mvd0 | Inferred to 0. |
| 7 | Inferred to Bi-mode(==2). | Signaled | Signaled | Signaled | Signaled | Equal to $b_1$*mvd0 | Signaled |

With respect to Table 7A and 7B, in one example, mvd1 can be adaptively derived from mvd0, depending on whether mvd0 is signaled. In one example, mvd1 may be derived as follows:

signHor=(((mvp0.hor<0) && (mvp1.hor<0))‖
 ((mvp0.hor>0) && (mvp1.hor>0)))?1:−1 mvd1.hor=signHor*mvd0.hor signVer=(((mvp0.ver<0) && (mvp1.ver<0))‖
 ((mvp0.ver>0) && (mvp1.ver>0)))?1:−1 mvd1.ver=signVer*mvd0.ver wherein,
signHor is a sign of the horizontal motion component;
mvp0.hor is the horizontal component of mvp0;
mvd0.hor is the horizontal component of mvd0;
mvp1.hor is the horizontal component of mvp1;
mvd1.hor is the horizontal component of mvp1;
signVer is a sign of the vertical motion component;
mvp0.ver is the vertical component of mvp0;
mvd0.ver is the vertical component of mvd0;
mvp1.ver is the vertical component of mvp1;
mvd1.ver is the vertical component of mvp1;
In one example, mvd1 may be derived as follows:

signHor=(((mvp0.hor<0) && (mvp1.hor<0))‖
 ((mvp0.hor>0) && (mvp1.hor>0)))? 1:−1 mvd1.hor=signHor*mvd0.hor signVer=(((mvp0.ver<0) && (mvp1.ver<0))‖
 ((mvp0.ver>0) && (mvp1.ver>0)))?1:−1 mvd1.ver=signVer*mvd0.ver if(mvp1.hor==0) mvd1.hor=0 if(mvp1.ver==0) mvd1.ver=0

Figure 15A:
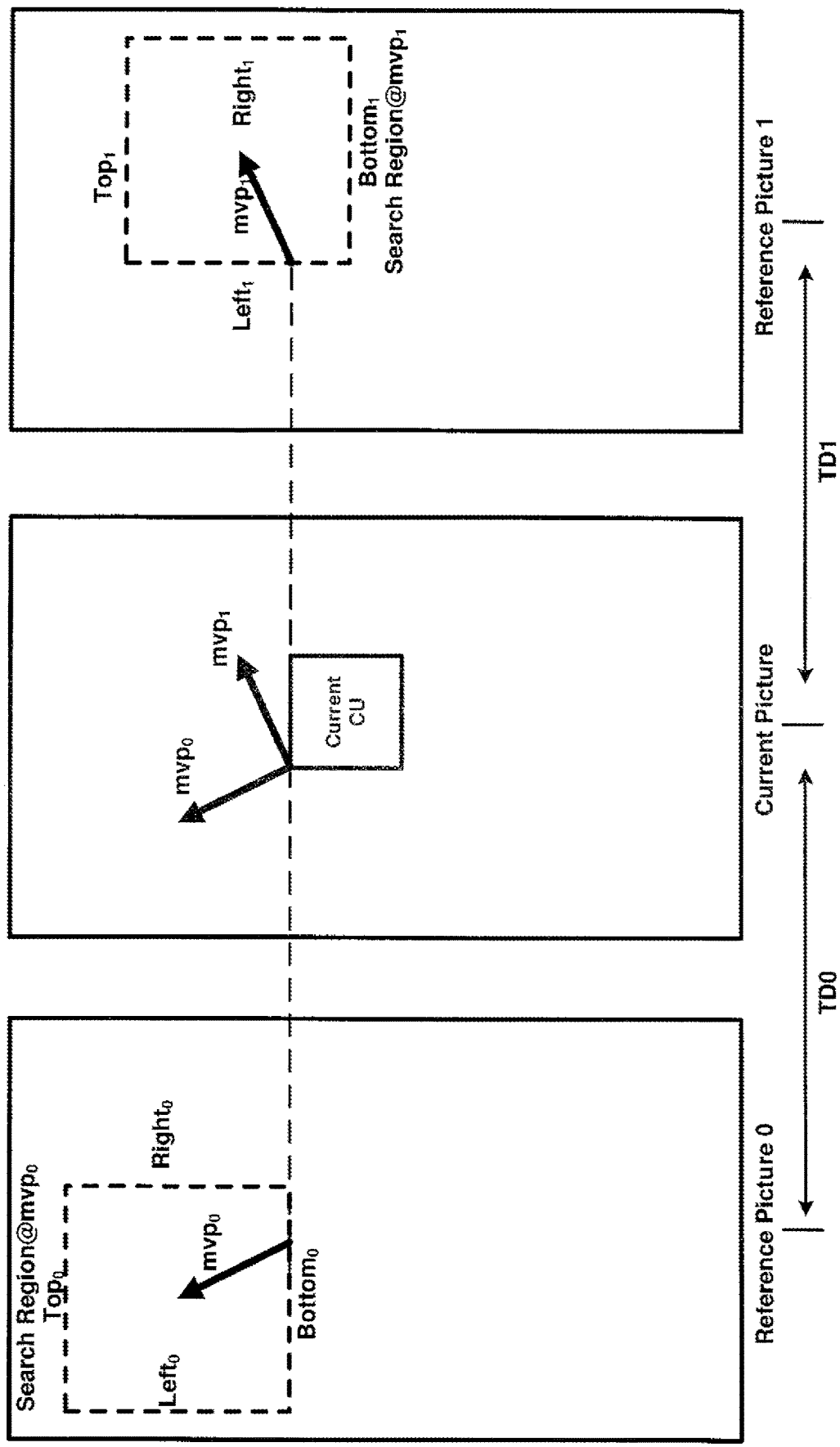
FIG. 15A is a conceptual diagram illustrating a search range according to one or more techniques of this disclosure.
Figure 15B:
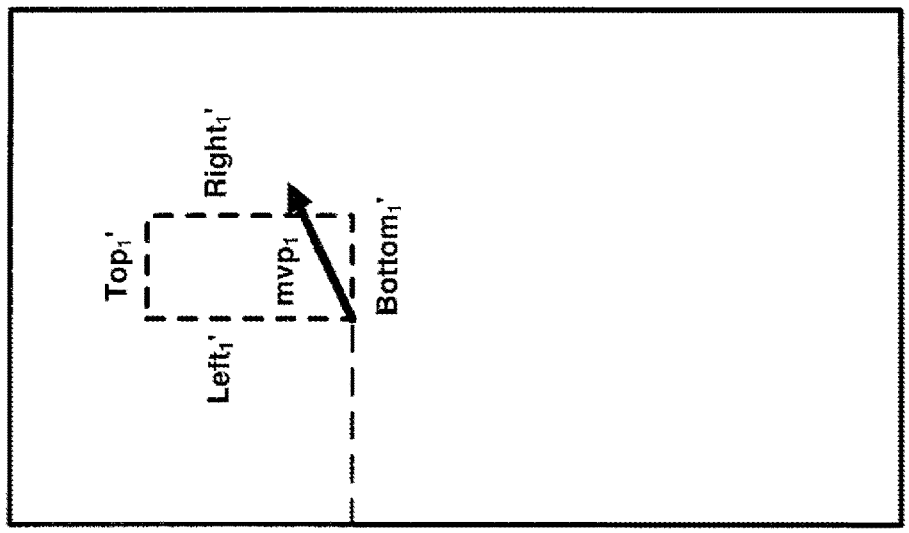
FIG. 15B is a conceptual diagram illustrating a search range according to one or more techniques of this disclosure.

In one example, a MV0 and/or MV1 in a Bi-AMVP mode may be determined according to a search process. For example, in one example, for each potential candidate mvp, a corresponding delta value may be determined according to a search process. That is, a search process may be performed for each mvp candidate to determine a motion vector and thus, a mvd value. In one example, a search range for determining a mvd may be determined as an intersecting region between a forward search range and a backward search range. For example, referring to FIG. 15A, a forward motion vector predictor, mvp0 having components (mvx0, mvy0), may form the center of an initial search range having dimensions top0, bottom0, left0, and right0, and a backward motion vector predictor, mvp1 having components (mvx1, mvy1), may form the center of an initial search range having dimensions top1, bottom1, left1, and right1. A restricted search range for determining MV0 (i.e., mvp0+mvd0) may have dimensions top0', bottom0', left0', and right0' and a restricted search range for MV1 (i.e., mvp1+mvd1) may have dimensions top1', bottom1', left1', and right1'. Referring to FIG. 15B, FIG. 15B illustrates an example where top0', bottom0', left0', and right0' and top1', bottom1', left1', and right1' are determined as the overlapping regions of the initial search ranges. In one example, top0', bottom0', left0', and right0' may be determined by excluding the region of top0', bottom0', left0', and right0' not encapsulated by the region defined by top1', bottom1', left1', and right1'. In one example, top1', bottom1', left1', and right1' may be determined by excluding the region of top1', bottom1', left1', and right1' not encapsulated by the region defined by top0', bottom0', left0', and right0'. In one example, top1', bottom1', left1', and right1' may be determined by centering top0', bottom0', left0', and right0' at $mvp_1$.

In one example, with respect to MV0 and MV1 and the respective initial search ranges the following initial values may be defined:

topDist0=mvy0−top0;

bottomDist0=bottom0−mvy0;

leftDist0=mvx0−left0;

rightDist0=right0−mvx0;

topDist1=mvy1−top1;

bottomDist1=bottom1−mvy1;

leftDist1=mvx1−left1; and rightDist1=right1−mvx1.

In one example, a variable a may be calculated as:

$$a = \frac{POC_1 - POC_{CUR}}{POC_0 - POC_{CUR}}$$

Where,
$POC_{CUR}$ is the POC value of the current picture,
$POC_0$ is the POC value of reference picture 0, and
$POC_1$ is the POC value of reference picture 1,
In one example, when a is greater than 0, topDist0; bottomDist0; leftDist0; rightDist0; topDist1; bottomDist1; leftDist1; and rightDist1 may be updated as follows:

```
if (topDist1 > topDist0*a)
    topDist1 = topDist*
else
    topDist0 = topDist1/a
if (bottomDist1 > bottomDist0*a)
    bottom Dist1 = bottomDist0*a
else
    bottomDist0 = bottomDist1/a
```

-continued

```
if (leftDist1 > leftDist0*a)
    leftDist1 = leftDist0*a
else
    leftDist0 = leftDist1/a
if (rightDist1 > rightDist0*a)
    rightDist1 = rightDist0*a
else
    rightDist0 = rightDist1/a
``` and when a is less than 0, topDist0; bottomDist0; leftDist0; rightDist0; topDist1; bottomDist1; leftDist1; and rightDist1 may be updated as follows:

```
if (topDist1 > bottomDist0*a)
    topDist1 = bottomDist0*
else
    bottomDist0 = topDist1/a
if (bottomDist1 > topDist0*a)
    bottom Dist1 = topDist0*a
else
    topDist0 = bottomDist1/a
if (leftDist1 > rightDist0*a)
    leftDist1 = rightDist0*a
else
    rightDist0 = leftDist1/a
if (rightDist1 > leftDist0*a)
    rightDist1 = leftDist0*a
else
    left Dist0 = rightDist1/a
```

Thus, the restricted search range for MV0 and MV1 may be determined according to the following:

top0'=mvy0−topDist0;

mvy0'=bottom0−bottomDist0;

left0'=mvx0−leftDist0; and mvx0'=rights0−rightDist0.

top1'=mvy1−topDist1;

mvy1'=bottom1−bottomDist1;

left1'=leftDist1; and mvx1'=right1−rightDist1.

As described above, in Bi-AMVP, a forward motion vector may be mvp0+mvd0 and a backward motion vector may be mvp1+mvd1. In one example, a motion vector resolution refinement may be performed for the forward motion vector and/or the backward motion vector. In one example, variables shift_for_mv_predictor and shift_for_mv_offset may be implicitly determined from coding/video properties and/or explicitly signaled (e.g., in a parameter set, a slice header, or a CU header) and the refined motion vectors may be calculated as follows:
If shift_for_mv_predictor>0

MV0'=((mvp0+(1<<(shift_for_mv_predictor−1)))>>shift_for_mv_predictor)+((mvd0+(1<<(shift_for_mv_offset)))>>shift_for_mv_offset)

MV1'=((mvp1+(1<<(shift_for_mv_predictor−1)))>>shift_for_mv_predictor)+((mvp1+(1<<(shift_for_mv_offset)))>>shift_for_mv_offset)

Referring again to Table 7, as illustrated in Table 7, in some cases both mvp1 and mvd1 are derived from mvp0 and mvd0 (or vice-versa). Such cases may be referred to as a complete inheritance (CI) Bi-AMVP mode. Further, in as illustrated in Table 7, in some cases, mvd1 is derived from mvd0 and mvp1 is signaled independent of mvp0. Such cases may be referred to as a partial inheritance (PI) Bi-AMVP mode. Further, in as illustrated in Table 7, in some cases, mvd1 and mvp1 are signaled independent of mvd0 and mvp0. Such cases may be referred to as an independent Bi-AMVP mode.

In some examples, when a CI Bi-AMVP mode or a PI Bi-AMVP mode is used (or other inter prediction modes), possible mvd values may be compressed and an mvd value may be reconstructed from a compressed mvd value. In one example, a compressed mvd value may be reconstructed according to the following process:

uiUncompressed.MVAbs=ReconstructMV(uiCompressedMVAbs);

Input: uiCompressedMVAbs, where uiCompressedMVAbs is an absolute mvd value (e.g., x or y component);

Output: uiUnCompressedMVAbs, where uiUnCompressedMVAbs is a reconstrued absolute mvd value;

```
if (uiUncompressedMVAbs < 3)
    uiUnCompressedMVAbs = uCompressedMVAbs;
else if (uiCompressedMVAbs % 2)
    uiUnCompressedMVAbs = 4 << ((uiCompressedMVAbs - 3) >> 1);
else
{
    uiUnCompressedMVAbs = 4 << (uiCompressedMVAbs - 3) >> 1);
    uiUnCompressedMVAbs += uiCompressedMVAbs >> 1;
}
```

It should be noted that

```
{
uiUnCompressedMVAbs = 4 << ((uiCompressedMVAbs - 3) >> 1);
uiUnCompressedMVAbs += uiCompressedMVAbs >> 1;
}
``` may be equivalently expressed as:

$$uiUnCompressedMVAbs=6<<((uiCompressedMVAbs-3)>>1);$$

OR $$uiCompressedMVAbs=3<<((uiCoinpressedMVAbs-1)>>1);$$

In one example, an mvd value may be compressed according to the following process:

```
uiCompressedMVAbs = CompressMV(uiUncompressedMVAbs);
Input : uiUncompressedMVAbs;
Output: uiCompressedMVAbs;
if (uiUncompressedMVAbs < 3)
        uiCompressedMVAbs = uiUncompressedMVAbs
else
{
    a = log2(uiUncompressedMVAbs)
    if ((1 << a) == uiUncompressedMVAbs)
        uiCompressedMVAbs = 2*a - 1;
    else if (a > 1 && (3 << (a¯ 1)) == uiUncompressedMVAbs)
        uiCompressedMVAbs = 2*a;
    else
       return -1; // invalid
}
return uiCompressedMVAbs
``` where, log 2(x) is a function that returns an integer value that is the largest value y for which 1<<y<=x;

In one example, a compression process can be enabled by repeating reconstruction process, for example as follows:

```
uiCompressedMVAbs = CompressMV(uiUncompressedMVAbs);
Input : uiUncompressedMVAbs
Output : uiCompressedMVAbs
for (Index = 0; Index < MaxCompressedMVDValue; Index ++)
{
    if (uiUncompressedMVAbs == ReconstructMV(Index)
       uiCompressedMVAbs = Index
}
return uiCompressedMVAbs
```

In one example, an MVD compression and reconstruction process is performed at a video encoder. Then, only a set of representative (quantized) MVD values are searched. The video encoder may signal the compressed MVD values. A video decoder receiving the compressed MVD values may decode the compressed MVD values and reconstruct them to derive the uncompressed MVD values.

Figure 10:
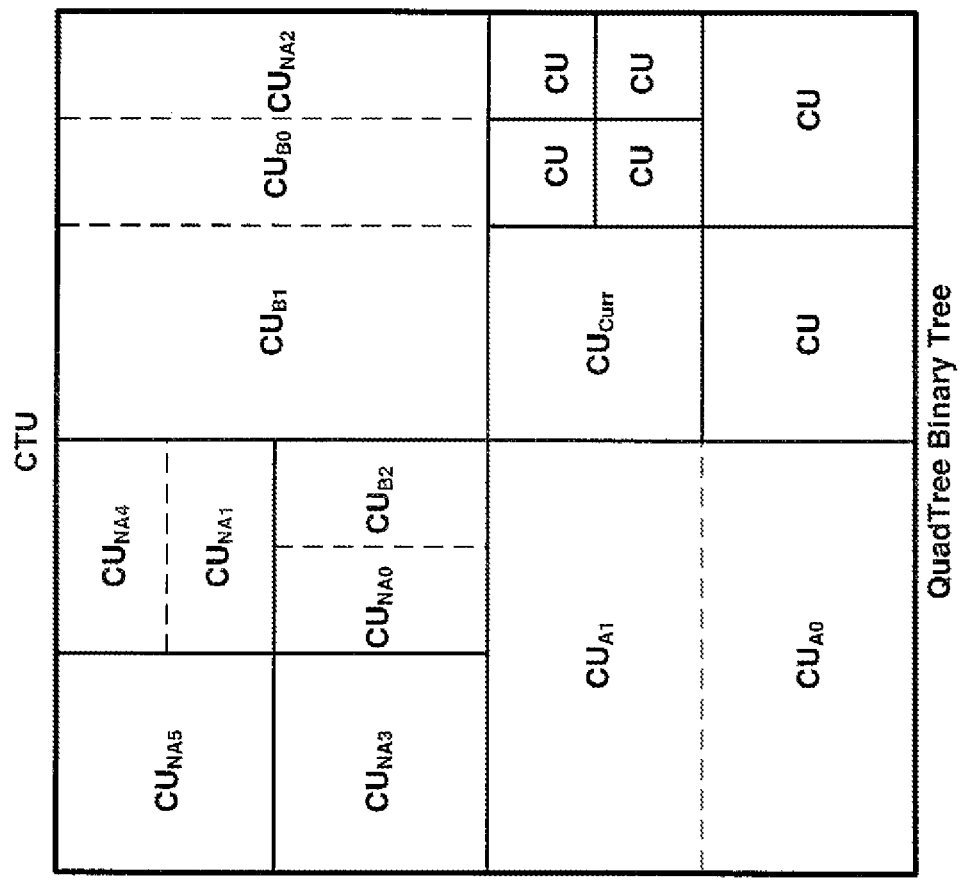
FIG. 10 is a conceptual diagram illustrating the position neighboring video blocks for inclusion in a set of candidate motion vector predictors in accordance with one or more techniques of this disclosure.

In one example, inter prediction processing unit 214 may be configured to perform motion vector prediction using a so-called E-Merge mode. According to an E-Merge mode, a list of merge candidate may be derived and an index value may indicate a selected merge candidate. According to an E-Merge mode, inter prediction processing unit 214 may derive a set of spatial candidates from adjacent and non-adjacent CUs. That is, all available MVs inside the current CTU may be considered as spatial candidates. FIG. 10 illustrates an example of a set of spatial candidates from adjacent CUs (i.e., $CU_{A0}$, $CU_{A1}$, $CU_{B2}$, $CU_{B1}$, and $CU_{B0}$)) and non-adjacent CUs (i.e., $CU_{NA0}$, $CU_{NA01}$, $CU_{NA02}$, $CU_{NA3}$, $CU_{NA4}$, and $CU_{NA5}$) of a current CU ($CU_{Curr}$) within a current CTU. Further, according to an E-Merge mode, inter prediction processing unit 214 may derive a set of temporal candidates. For example, a set of temporal candidates may include four temporal candidates having the following temporal collocated positions with respect to a current video block: a right bottom position candidate, a center position candidate, a left bottom position candidate, and a right top position candidate. Table 8 illustrates a set of spatial candidates from adjacent CUs, a set of spatial candidates from non-adjacent CUs, and temporal candidates for the example current CU illustrated in FIG. 10.

TABLE 8

| Candidate Type | Candidate | Type |
|---|---|---|
| Spatial Adjacent | $CU_{A1}$ | Uni |
| | $CU_{B1}$ | Bi |
| | $CU_{A0}$ | Bi |
| | $CU_{B0}$ | Uni |
| | $CU_{B0}$ | Uni |
| Spatial Non-Adjacent | $CU_{NA0}$ | Bi |
| | $CU_{NA1}$ | Bi |
| | $CU_{NA2}$ | Uni |
| | $CU_{NA3}$ | Uni |
| | $CU_{NA4}$ | Uni |
| | $CU_{NA5}$ | Uni |
| Temporal | $Temp_{RB}$ | Uni |
| | $Temp_{LB}$ | Bi |
| | $Temp_{RT}$ | Bi |
| | $Temp_{Center}$ | Uni |

For each uni-prediction candidate, inter prediction processing unit 214 may derive a paired set of motion vectors, MV0 and MV1, according to the technique described above. Further, for each uni-prediction candidate, inter prediction processing unit 214 may derive a paired set of motion vectors, MV0' and MV1' having offset values which are derived according to a template or bi-lateral matching, which may be performing by both a video encoder and video decoder, e.g., according to the techniques described above. Further, in one example, offset values may be signaled with an index value indicating a selected candidate. In one example, higher level signaling (e.g., a flag in a parameter set) may indicate whether the offset values are signaled. Table 9 illustrates derived paired sets of motion vectors for uni-prediction motion vector candidates. For each bi-prediction candidate, inter prediction processing unit 214 may derive a paired set of motion vectors, MV0 and MV1, for each of MV0 and MV1 included in the bi-prediction for example, according to the technique described above. Further, for each bi-prediction candidate, inter prediction processing unit 214 may derive a paired set of motion vectors, MV0' and MV1' having offset values which are derived according to template or bi-lateral matching, according to the techniques described above. Table 9 illustrates derived paired sets of motion vectors for bi-prediction motion vector candidates.

TABLE 9

| Candidate Type | Candidate | Type |
|---|---|---|
| Spatial Adjacent | $CU_{A1}$<br>MV0 = ($MV0_x$, $MV0_y$) | Uni |
| | $CU_{A1}$ Derived$_1$<br>MV0 = ($MV0_x$, $MV0_y$),<br>MV1 = ($a_1$*$MV0_x$, $a_1$*$MV0_y$) | Bi |
| | $CU_{A1}$ Derived$_{offset}$<br>MV0' = ($MV0_x$ + offset_x, $MV0_y$ + offset_y),<br>MV1' = ($a_1$*( $MV0_x$ + offset_x), $a_1$*( $MV0_y$ + offset_y))<br>. . . | Bi |
| Spatial Non-Adjacent | $CU_{N A0}$<br>MV0 = ($MV0_x$, $MV0_y$)<br>MV1 = ($MV1_x$, $MV1_y$) | Bi |
| | $CU_{N A0}$ Derived$_{MV0}$<br>MV0 = ($MV0_x$, $MV0_y$),<br>MV1 = ($a_1$*$MV0_x$, $a_1$*$MV0_y$) | Bi |
| | $CU_{N A0}$ Derived$_{MV1}$<br>MV0 = ($MV1_x$, $MV1_y$),<br>MV1 = ($a_1$*$MV1_x$, $a_1$*$MV1_y$) | Bi |
| | $CU_{N A0}$ Derived$_{offset}$<br>MV0' = ($MV0_x$ + offset_x, $MV0_y$ + offset_y),<br>MV1' = ($MV1_x$ + $a_1$*offset_x, $MV1_y$ + $a_1$*offset_y)<br>. . . | Bi |
| Temporal | Temp$_{RS}$<br>MV0 = ($MV0_x$, $MV0_y$) | Uni |
| | Temp$_{RS}$ Derived$_1$<br>MV0 = ($MV0_x$, $MV0_y$),<br>MV1 = ($a_1$*$MV0_x$, $a_1$*$MV0_y$) | Bi |
| | Temp$_{RS}$ Derived$_{offset}$<br>MV0' = ($MV0_x$ + offset_x, $MV0_y$ + offset_y),<br>MV1' = ($a_1$*( $MV0_x$ + offset_x), $a_1$*( $MV0_y$ + offset_y))<br>. . . | Bi |

According to an E-Merge mode, inter prediction processing unit 214 may perform a global thinning and ordering process to the list of candidates including all of the derived candidates. Each candidate to be potentially added to the list may be compared to candidates already included in the list and if the MV difference between the new candidate and any previous candidate in the current list is less than a predefined threshold (e.g., a threshold determined by a video decoder and signaled to a video decoder, or a threshold defined according to a standard), the new candidate is not added to the current candidate list. In one example, the threshold value may be adaptively changed depending on the MV resolution (e.g., a MV resolution signaled at CTU/CU-level). In one example, after all candidates are added to the list, the final candidates can be resampled considering their unicity and diversity (if necessary). For example, the covered regions can be defined by all current candidates in the list and the final MV candidates may be resampled in the covered regions by uniform sampling up to a predefined (or specified) number of E-merge candidates. The final candidates in the list may be reordered. In one example, the final candidates may be reordered according to the following rules: candidates derived from spatially neighboring CUs may have the relative highest priorities, candidates having small absolute values may have the next relative highest priorities, bi-directional MVs may have higher priorities than uni-directional MVs, and candidates, which are more frequently selected in the previous CUs, may have relatively higher priorities than candidate which are less frequently selected.

As illustrated in Table 9, candidates may have different types. In one example, all motion vector candidates in a candidate list may be categorized into one of the following categories:

Category 0: MV candidates inherited from spatially adjacent CUs (e.g., $CU_{A1}$);

Category 1: MV candidates inherited from spatially non-adjacent CUs (e.g., $CU_{N A0}$);

Category 2: MV candidates inherited from temporally collocated CUs (e.g., Temp$_{RB}$);

Category 3: MV candidates derived from spatially adjacent CUs without derived offsets (e.g., $CU_{A1}$ Derived$_1$);

Category 4: MV candidates derived from spatially non-adjacent CUs without derived offsets (e.g., $CU_{N A0}$ Derived$_1$);

Category 5: MV candidates derived from temporally collocated CUs without derived offsets (e.g., Temp$_{RB}$ Derived$_1$);

Category 6: MV candidates derived from spatially adjacent CUs with derived offsets (e.g., $CU_{A1}$ Derived$_{offset}$);

Category 7: MV candidates derived from spatially non-adjacent CUs with derived offsets (e.g., $CU_{N A0}$ Derived$_{offset}$;

Category 8: MV candidates derived from temporally collocated CUs with derived offsets Temp$_{RB}$ Derived$_{offset}$)

In one example, for each category, an independent thinning and ordering process can be performed. Further, in one example, each category can be ordered in a final list, for example, as follows: Category 0; Category 3; Category 2; Category 1; Category 5; Category 6; Category 4 Category 8; Category 7.

In one example, for diversity of candidates, a few representative candidates may be chosen among various candidate categories. For example, the first available of a candidate in a category may be selected. In one example, the selected candidate from a category may be used as an origin point and new candidates may be derived by adding offsets to origin points. In some examples, new candidates may be signaled using an index corresponding to a selected candidate and a signaled offset value. In one example, signaling an index corresponding to a selected candidate and offset value may be according to a starting point, a motion magnitude, and a motion direction expression in a manner similar to that described above with respect to J10024. Further, offset values can be adjusted by an AMVR index or neighboring contexts.

In one example, a final list of candidates may be inherited for a CU. For example, in one example, within a CTU, once a merge candidate list is constructed for a CU, the list can be inherited for a subsequently coded CU in the CTU. Further, in some examples, the inherited list can be updated by adding new candidates. In some cases, instead of accessing relatively spatially far CUs from a current CU for construction of a list, for a current. CU, propagating a well-constructed list may be more efficient. Further, it should be noted that in some cases, E-Merge mode, may not be allowed for particular CUs with a CTU. For example, referring to FIG. 10, for the CU labelled CUNA5, E-Merge mode may be inefficient as a generated list may have relatively few candidates, as spatial CUs within the CTU may not be available (e.g., due to a Z-scan coding order). Further, in some cases, a flag may be signaled to indicate whether a CU is allowed to access spatial CUs outside a current CTU for purposes of creating an initial candidate list and thus, whether E-Merge mode is allowed for CUs. For example, a high level flag (e.g., slice header or parameter set flag) may indicate whether a top-left CU in a CTU is allowed to access spatial CUs outside a current CTU for purposes of creating an initial candidate list.

As described above, according to an E-Merge mode for a current CU, an initial list of motion vector candidates is derived and a thinning process and ordering process may be applied to the initial list of candidates to derive a final list of motion vector candidates. For a subsequent CU, the final list of motion vector candidates from the previous CU may be inherited as a list of motion vector candidates and the inherited list can be updated for the subsequent CU by adding new candidates. In one example, an E-Merge mode may derive a CTU-level list of motion vector candidates in one example, the CTU-level list of motion vector candidates may be derived by deriving an initial list of motion vector candidates for the top-left CU (or another first coded CU in a CTU) in the CTU and applying a thinning process and an ordering process to the initial list of motion vector candidates to generate a CTU-level list of motion vector candidates. In one example, each CU in the CTU (e.g., each CU coded after the top-left CU according to a raster scan order) may inherit the CTU-level list and update the CTU-level list to generate a respective final CU-level list of motion vector candidates. It should be noted that, as described above, steps for deriving an initial list and performing thinning/ordering to generate a final list may be performed interchangeably. That is, for example, derivation and thinning/ordering may be performed on a category-by-category basis.

Figure 14:
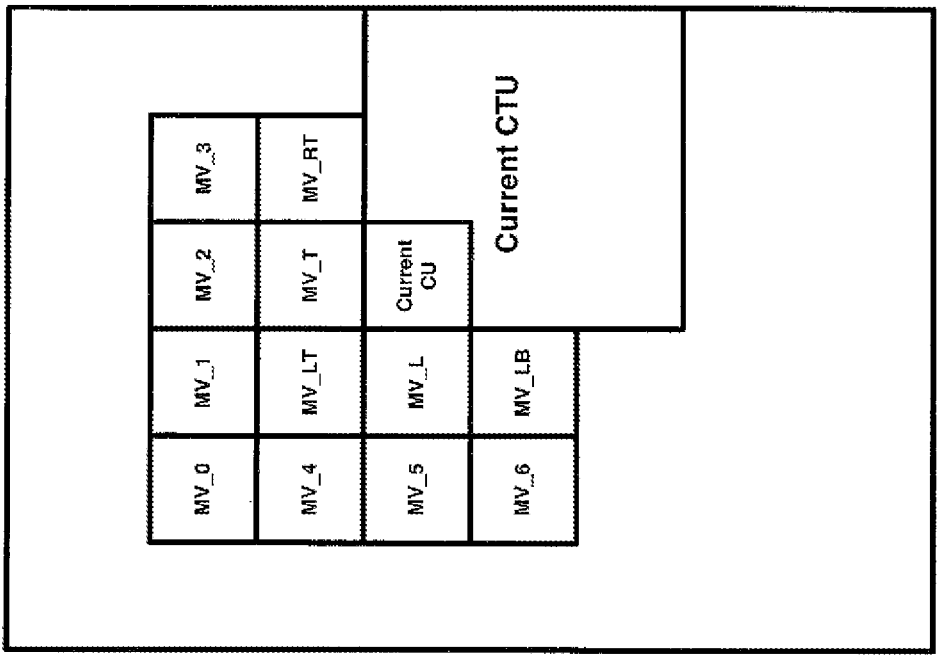
FIG. 14 is a conceptual diagram illustrating the position neighboring video blocks for inclusion in a set of candidate motion vector predictors in accordance with one or more techniques of this disclosure.
Figure 14:
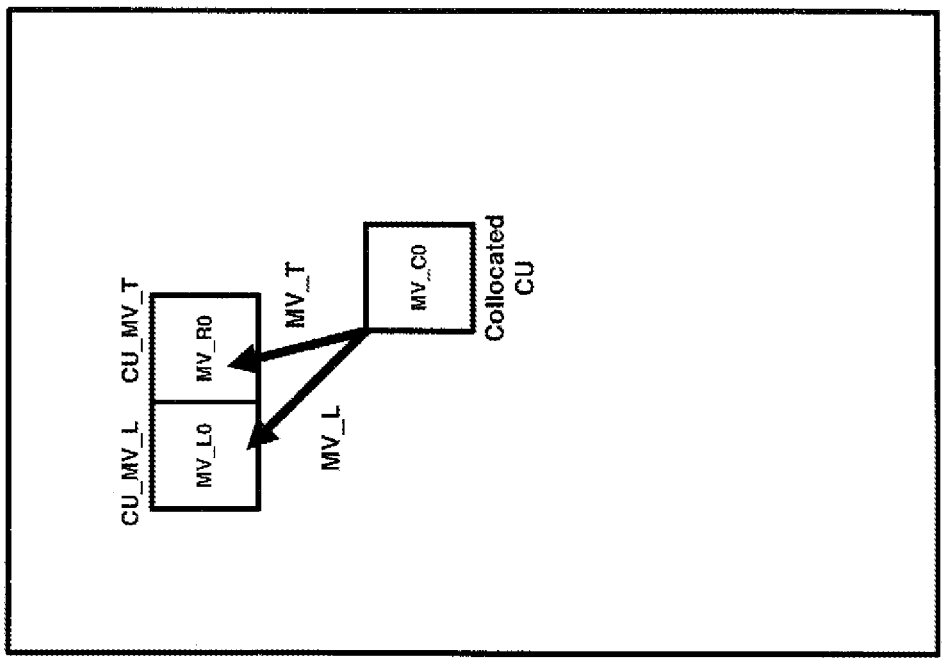

Referring to FIG. 14, in one example, the derivation of an initial list of motion vector candidates for a current CU (e.g., the top-left CU in the CTU) may include adding potential motion vector candidates from the following three categories: motion vector candidates inherited from spatially adjacent CUs to the current CU, which are illustrated as MV_LB, MV_L, MV_LT, MV_T, and MV_RT in the example of FIG. 14; motion vector candidates inherited from spatially non-adjacent CUs to the current CU, which are illustrated as MV_0 to MV_6 in the example of FIG. 14; and temporal motion vector candidates. In the example illustrated in FIG. 14 temporal motion vector candidates include a motion vector associated with a CU in a reference picture which is collocated with the current CU, a motion vector associated with the CU that is displaced from the current CU according to the motion vector MV_T, and a motion vector associated with the CU that is displaced from the current CU according to the motion vector MV_L. It should be noted that although FIG. 14 illustrates a single reference picture, in other examples, temporal motion vector candidates may be derived from one or more reference pictures (e.g., reference picture 0 and reference picture 1).

In one example, deriving a final list for a current CU, (and thus, the CTU-level list of motion vector candidates) may include adding motion vector candidates inherited from spatially adjacent CUs to the current CU to the final list (MV_LB, MV_L, MV_LT, MV_T, and MV_RT) with redundant entries removed, adding a representative number of non-redundant motion vector candidates from spatially non-adjacent CUs (e.g., adding two of MV_0 to MV_6) to the final list, and adding a representative number of non-redundant motion vector candidates from temporal motion vector candidates (e.g., adding one of MV_L0, MV_R0, or MV_C0) to the final list. It should be noted that redundancy may be based on two motion vectors being equal or having component values within a specified threshold of one another. For example, if respective x-components and/or y-components of motion vectors are within a threshold, the motion vectors may be considered to be redundant.

In one example, adding a representative number of non-redundant motion vector candidates from spatially non-adjacent CUs to the final list may include defining regions. For example, referring to FIG. 14, defined regions may include a top region including the non-adjacent CUs MV_1, MV_2, and MV_3; a left region including the non-adjacent CUs MV_4, MV_5, and MV_6; and a diagonal region including the non-adjacent CU MV_0. In one example, for each region, one or more representative motion vectors may be derived. A representative motion vector may be derived, for example, by one or more of: selecting a motion vector in a region based on availability (e.g., select the first available of MV_1, MV_2, or MV_3) and/or performing a function on two or more motion vectors in a region (e.g., MV_1 and MV_2 may be averaged and MV_2 and MV_3 may be averaged to generate two representative motion vectors). Non-redundant derived representative motion vectors may be added to the final list. For example, for a top region, if a set of representative motion vectors includes the first available of MV_1, MV_2, or MV_3 and one of the average of MV_1 and MV_2 or the average of MV_2 and MV_3, when MV_1 is added to the final list, if the average of MV_1 and MV_2 is redundant to MV_1, the average of MV_2 and MV_3 may be added to the final list. For the left region, in the case where MV_1 and the average of MV_2 and MV_3 were previously added to the list, the first available of MV_4, MV_5, or MV_6, which is non-redundant to MV_1 or the average of MV_2 and MV_3 may be added to the final list and one of the average of MV_4 and MV_5 or the average of MV_5 and MV_6 may be added to the final list, if it is non-redundant to any motion vector previously added to the list. It should be noted that such a process may be repeated for any number of regions until the final candidate list includes a predefined number of candidates from spatially non-adjacent CUs. Further, it should be noted the order in which regions are evaluated may be predefined. For example, regions may be evaluated according to the following order: top, left, and diagonal.

In one example, adding a representative number of non-redundant motion vector candidates from temporal motion vector candidates to the final list may be similar to adding a representative number of non-redundant motion vector candidates from spatially non-adjacent CUs to the final list. That is, for each reference frame, one or more representative motion vectors (e.g., the first available of MV_L0, MV_R0, or MV_C0 and one of the average of MV_C0 and MV_R0 or the average of MV_C0 and MV_L0) may be derived and non-redundant representative motion vectors may be added to the final list until the final list includes a predefined number of candidates from temporal motion vector candidates. In one example, for ordering, motion vector candidates for each candidate may be grouped and the order of each candidate in a group may be predefined according to the order candidates are added to each group. In one example, a selected candidate motion vector may be identified by signaling a group (e.g., one of spatially adjacent, spatially non-adjacent, or temporal) and an index value corresponding to an order within the group. In one example, signaling a group may include signaling a flag indicating whether the selected candidate motion vector is in the spatially adjacent group, and if the selected candidate motion is not in the spatially adjacent group, signaling a flag indicating whether the selected candidate motion is in one of the spatially non-adjacent or temporal group. In one example, the indexing order of each candidate in a group may signaled (e.g., in a parameter set, slice header, or CTU level syntax). It should be noted that in the typical case, it is desirable to order candidates based on the likelihood of selection.

As described above, at each CU coded after the generation of the CTU-level, the CTU-level list may be inherited and updated to generate a respective final CU-level list of motion vector candidates. In one example, at a CU coded after the generation of the CTU-level list an initial list of CU level candidates may be generated. For example, an initial CU-level list may be generated by adding motion vector candidates inherited from spatially adjacent CUs, adding a representative number of non-redundant motion vector candidates from spatially non-adjacent CUs, and adding a representative number of non-redundant motion vector candidates from temporal MV candidates in an manner similar to that described above. A flag may indicate whether the initial list of CU-level candidates is updated based on the CTU-level list (i.e., whether the CTU-level list is inherited). In one example, when the CTU-level list is inherited, non-redundant candidate motion vectors in the CTU-level list are added to initial list of CU level candidates to generate an final list of CU level candidates. In one example, when the CTU-level list is not inherited, the initial list of CU level candidates become the final list of CU level candidates. It should be noted that when the CTU-level list is inherited, in the typical case, the CU will be associated with a unique list of motion vector candidates (i.e., each CU within a CTU may be associated with a unique list). In one example, the CTU-level list may be updated based on each derived CU-level list. For example, if a CU selects a particular motion vector as a motion vector predictor, the selected motion vector may be added to the CTU-level list.

In one example, motion vector candidates may be used to derive new motion vector candidates. For example, at a CU, a number of representative candidates may be selected (e.g., one representative candidate from each group of a CTU-level list) and for each representative candidate, one or more new motion vector candidates may be derived by determining an offset value. The one or more new candidates may added to a list of CU level candidates. For example, in one example, each representative candidate motion vector may be used as a motion vector origin and offset values may be determined according to the techniques described herein, (e.g., template or bi-lateral matching). Further, in some examples, offset values may be adjusted using an AMVR index or neighboring contexts as described above. As described above, for a motion vector, a symmetric paired motion vector may be derived by scaling the motion vector according to a POC distance. In one example, derived symmetric motion pairs may be added to the final CU-level motion candidate list.

As described above, a CTU-level list of motion vector candidates may be derived and used to construct CU level motion vector candidate lists. In one example, one or more CTU-level lists of motion vector candidates may be stored in a buffer. As described above, CTU-level lists may be updated at the CU-level. Thus, in some examples, one or more CTU-level lists stored in a buffer may be updated based on CU-level list determinations. Further, in one example, one or more CTU-level lists stored in a buffer may be used for generating and/or updating a CTU-level list for a current CTU. Thus, one or more CTU-level lists stored in a buffer may be propagated according to the scanning order of CTUs. In one example, at the first CTU in each slice, the buffer storing one or more CTU-level lists may be refreshed. In one example, a CTU group level list of motion vector candidates may be derived and used to construct CTU-level lists of motion vector candidates. For example, a CTU group level list may be constructed for a plurality spatial adjacent CTUs and/or CTUs included in a structure/region included CTUs (e.g., CTUs included in a tile). One or more CTU group level lists may be stored in a buffer. As such, CTU group level lists in a buffer may be used to generate CTU-level lists.

Figure 11A:
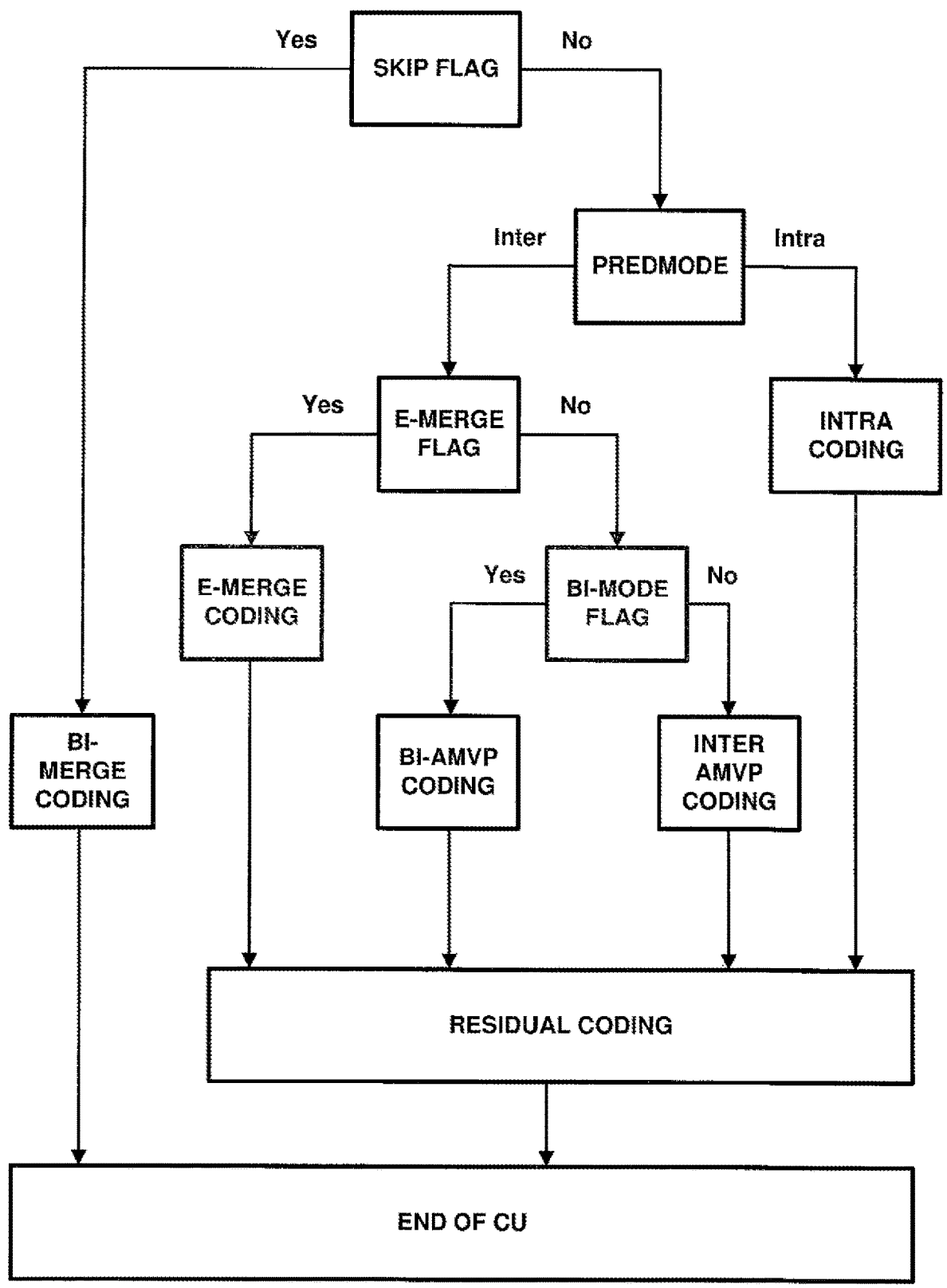
FIG. 11A is a block diagram illustrating an example of a coding structure that may be used to indicate a coding mode for a video block according to one or more techniques of this disclosure.
Figure 11B:
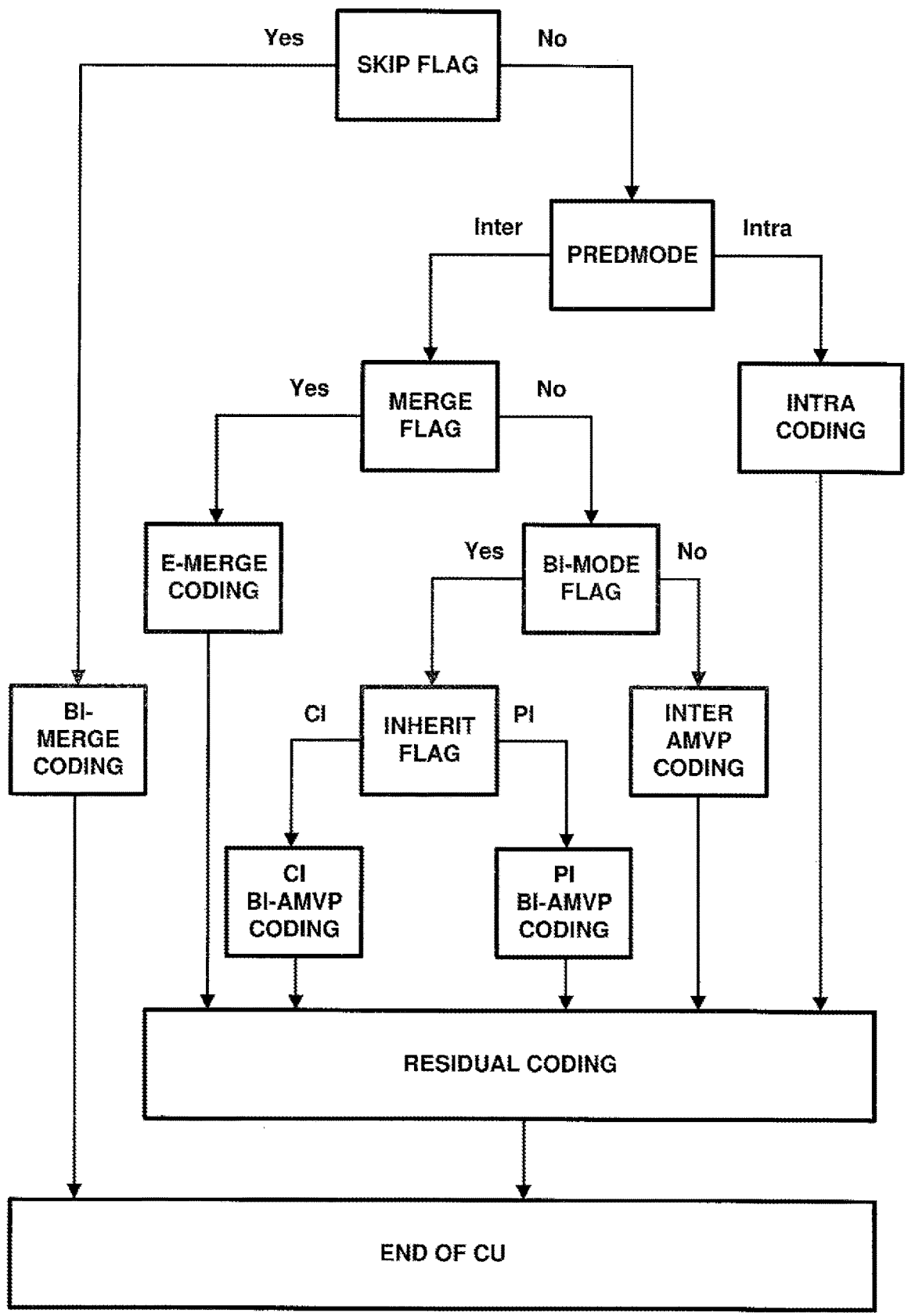
FIG. 11B is a block diagram illustrating an example of a coding structure that may be used to indicate a coding mode for a video block according to one or more techniques of this disclosure.

In one example, for each CU, one of a Bi-Merge mode, an E-Merge mode, or a Bi-AMVP mode may be indicated. In one example, for each CU one of a Bi-Merge mode, an E-Merge mode, or a Bi-AMVP mode may be indicated according to semantics and syntax elements based on the coding structure illustrated in FIG. 11A. As described above, in some cases, Bi-AMVP may include a CI Bi-AMVP mode and a PI Bi-AMVP mode. In one example, for each CU, one of a Bi-Merge mode, an E-Merge mode, a CI Bi-AMVP mode, or a PI Bi-AMVP mode may be indicated. In one example, for each CU one of a Bi-Merge mode, an E-Merge mode, a CI Bi-AMVP mode, or a PI Bi-AMVP mode may be indicated according to semantics and syntax elements based on the coding structure illustrated in FIG. 11B. It should be noted that in some examples a PI mode or a CI Bi-AMVP may be used with other combinations of inter prediction modes other than those illustrated in FIG. 11B. Further, in some cases, one of a CI Bi-AMVP mode and/or or a PI Bi-AMVP may be disallowed based on coding parameters and/or video properties. In such cases, a flag indicating one of a CI Bi-AMVP mode or a PI Bi-AMVP is not signaled. In one example, if the following condition is satisfied ($POC_{CUR}>POC_0$ && $POC_{CUR}>POC_1$), only a PI Bi-AMVP mode is allowed, otherwise both a CI Bi-AMVP mode or a PI Bi-AMVP mode is allowed.

Figure 12:
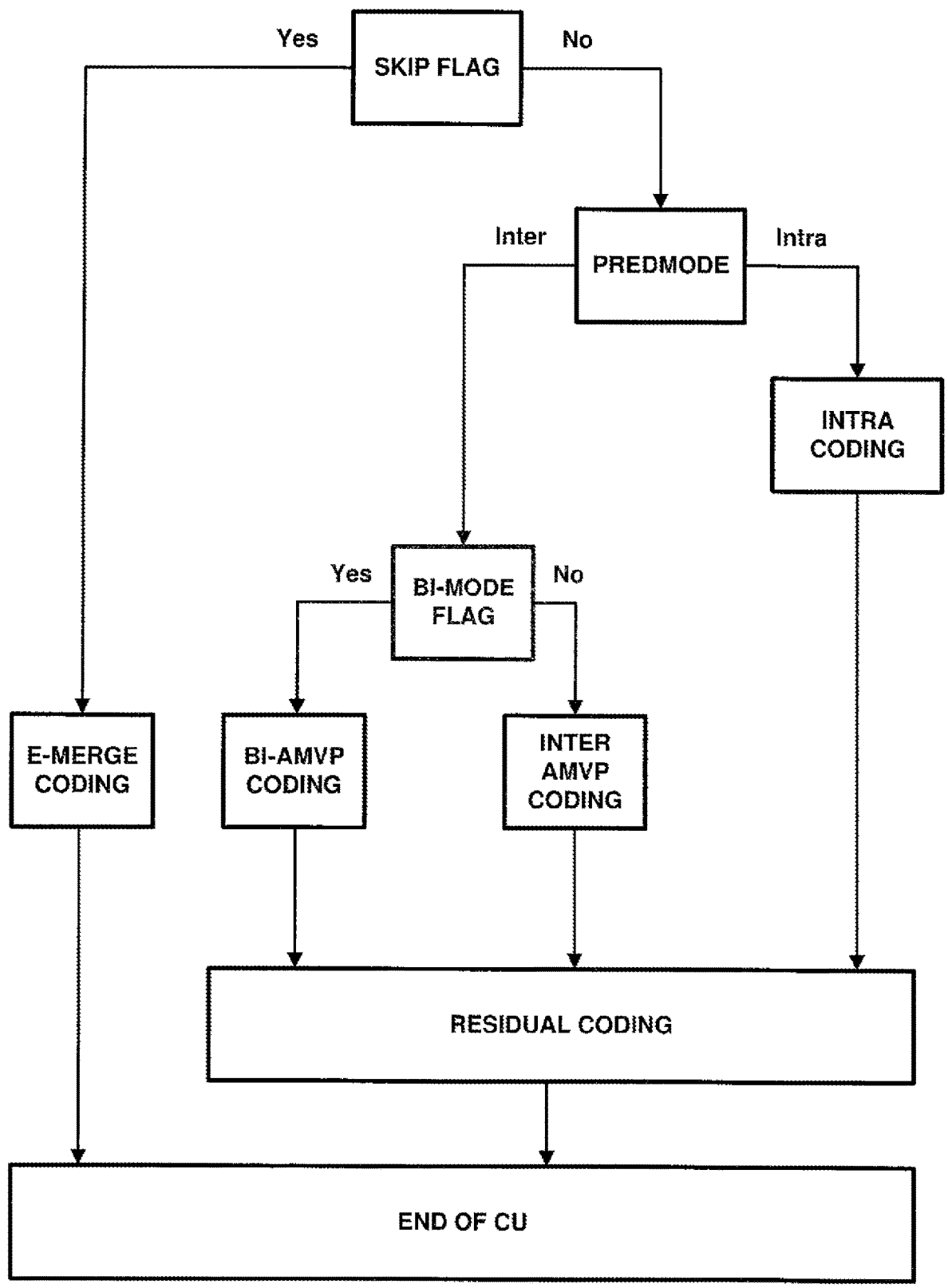
FIG. 12 is a block diagram illustrating an example of a coding structure that may be used to indicate a coding mode for a video block according to one or more techniques of this disclosure.

Further, in one example, for each CU, one of an E-Merge mode or a Bi-AMVP mode may be indicated. In one example, for each CU one of an E-Merge mode or a Bi-AMVP mode may be indicated according to semantics and syntax elements based on the coding structure illustrated in FIG. 12. It should be noted that in some examples, one or more one of a Bi-Merge mode, an E-Merge mode, or a Bi-AMVP mode may be disallowed for a CU. For example, CTU level flags may indicate with each of Bi-Merge mode, an E-Merge mode, or a Bi-AMVP mode are allowed for CUs. Further, each of Bi-Merge mode, an E-Merge mode, or a Bi-AMVP mode may be allowed or disallowed based on the order/position of a CU within a CTU. In such cases, the example coding structures in FIG. 11 and FIG. 12 may be simplified according, e.g., flags corresponding to disallowed modes are not signaled.

Referring again to FIG. 9, as illustrated in FIG. 9, inter prediction processing unit 214 may receive reconstructed video block via filter unit 216, which may be part of an in-loop filtering process. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner video encoder 200 represents an example of a device configured to receive a motion vector and a corresponding reference picture identifier for the motion vector, determine a reference picture corresponding to a second motion vector based on the reference picture corresponding to the received motion vector and a current picture, determine a scaling value based on the determined reference picture, the reference picture corresponding to the received motion vector, and the current picture, and generate the second motion vector by scaling the received motion vector according to the determined scaling value.

Figure 13:
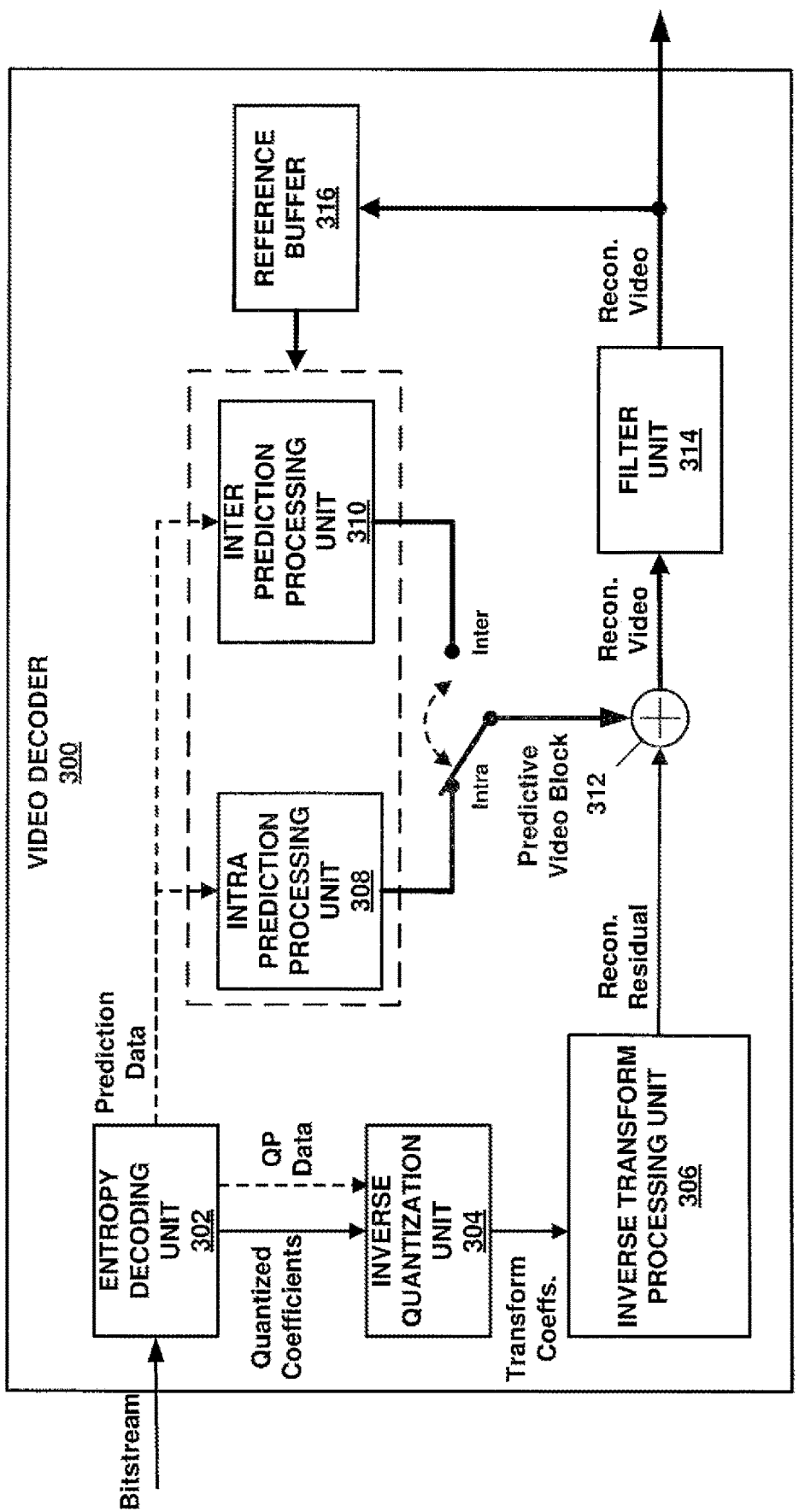
FIG. 13 is a block diagram illustrating an example of a video decoder that may be configured to decode video data according to one or more techniques of this disclosure.

FIG. 13 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 13 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 13, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. Inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 13, reconstructed residual data may be provided to summer 312. Summer 312 may add reconstructed residual data to a predictive video block and generate reconstructed video data.

As describe above, a predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

As described above, video decoder 300 may parse an encoded bitstream where the encoded bitstream is generated based on the techniques described above and as described above, video encoder 200 may generate a bitstream according to the motion vector prediction techniques described above. Thus, video decoder 300 may be configured to perform motion vector prediction according to techniques described above. In this manner video decoder 300 represents an example of a device configured to receive a motion vector and a corresponding reference picture identifier for the motion vector, determine a reference picture corresponding to a second motion vector based on the reference picture corresponding to the received motion vector and a current picture, determine a scaling value based on the determined reference picture, the reference picture corresponding to the received motion vector, and the current picture, and generate the second motion vector by scaling the received motion vector according to the determined scaling value.

Referring again to FIG. 13, filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 13 a reconstructed video block may be output by video decoder 300.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method of performing motion vector prediction for video data, the method comprising:
    performing bi-prediction according to a first mode of bi-prediction, wherein the first mode allows only bi-prediction;
    for the first mode of bi-prediction, performing inter prediction by:
        inferring an index value for a first reference picture list;
        generating a first motion vector based on a first signaled index value indicating a first motion vector predictor and a signaled value indicating a first motion vector difference value;
        inferring an index value for a second reference picture list; and
        generating a second motion vector based on a second signaled index value indicating a second motion vector predictor and a second motion vector difference value, wherein the second motion vector difference value is a scaled version of the first motion vector difference value, and
    wherein a resolution of the first motion vector difference value and the second motion vector difference value are adjusted according to a signaled motion vector difference resolution index value.

2. The method of claim 1, wherein the signaled motion vector difference resolution index value indicates one of ¼, 1, and 4 luma sample resolution.

3. A device of performing motion vector prediction for video data, the device comprising one or more processors configured to perform steps of:
  performing bi-prediction according to a first mode of bi-prediction, wherein the first mode allows only bi-prediction;
  for the first mode of bi-prediction, performing inter prediction by:
    inferring an index value for a first reference picture list;
    generating a first motion vector based on a first signaled index value indicating a first motion vector predictor and a signaled value indicating a first motion vector difference value;
    inferring an index value for a second reference picture list; and
    generating a second motion vector based on a second signaled index value indicating a second motion vector predictor and a second motion vector difference value, wherein the second motion vector difference value is a scaled version of the first motion vector difference value, and
  wherein a resolution of the first motion vector difference value and the second motion vector difference value are adjusted according to a signaled motion vector difference resolution index value.

4. The device of claim 3, wherein the signaled motion vector difference resolution index value indicates one of ¼, 1, and 4 luma sample resolution.

* * * * *